United States Patent [19]
Hayafune et al.

[11] Patent Number: 6,041,183
[45] Date of Patent: Mar. 21, 2000

[54] REMOTE MAINTENANCE SYSTEM AND METHOD FOR COMPUTER PERIPHERALS

[75] Inventors: Takeshi Hayafune, Hiratsuka; Kouichiro Maemura, Isehara; Takahito Miura, Kawasaki, all of Japan

[73] Assignee: Ricoh Company, Ltd., Tokyo, Japan

[21] Appl. No.: 08/932,210

[22] Filed: Sep. 17, 1997

[30] Foreign Application Priority Data

Sep. 17, 1996 [JP] Japan ................................. 8-244366

[51] Int. Cl.[7] .................................................. G06F 9/445
[52] U.S. Cl. ............................................................. 395/712
[58] Field of Search .............................. 395/712, 200.47, 395/200.49, 200.53, 200.54, 200.33; 709/203, 217, 219, 223, 224; 710/8, 15

[56] References Cited

U.S. PATENT DOCUMENTS

5,140,419  8/1992  Galumbeck et al. ................... 358/142
5,815,722  9/1998  Kalwitz et al. ......................... 395/712

Primary Examiner—John A. Follansbee
Attorney, Agent, or Firm—Cooper & Dunham LLP

[57] ABSTRACT

A remote maintenance system for computer peripherals includes at least one user system including at least one computer and at least one computer peripheral on which remote maintenance is performed and which includes a memory for storing maintenance data for identifying a model and for adjusting an operating condition of the apparatus, a source script file generator, located at a remote maintenance provider site and arranged to create a source script file including instructions for instructing at least one of operations of reading and writing the maintenance data, and a source script file transmitter for transmitting the created source script file to a link method, such as Internet, connecting the computer and the user system. The computer includes an instruction selector for generating a model-specific script file by selecting an arbitrary instruction, a download manager for downloading the model-specific script file, a maintenance application executor for transmitting the model-specific script file to the computer peripherals. The computer peripherals includes a maintenance executor which executes at least one of the operations of reading and writing the maintenance data in accordance with the instruction in the model-specific script file upon a receipt of the model-specific script file, and a result feedback manager for transmitting the result of the maintenance operation to the computer.

130 Claims, 19 Drawing Sheets

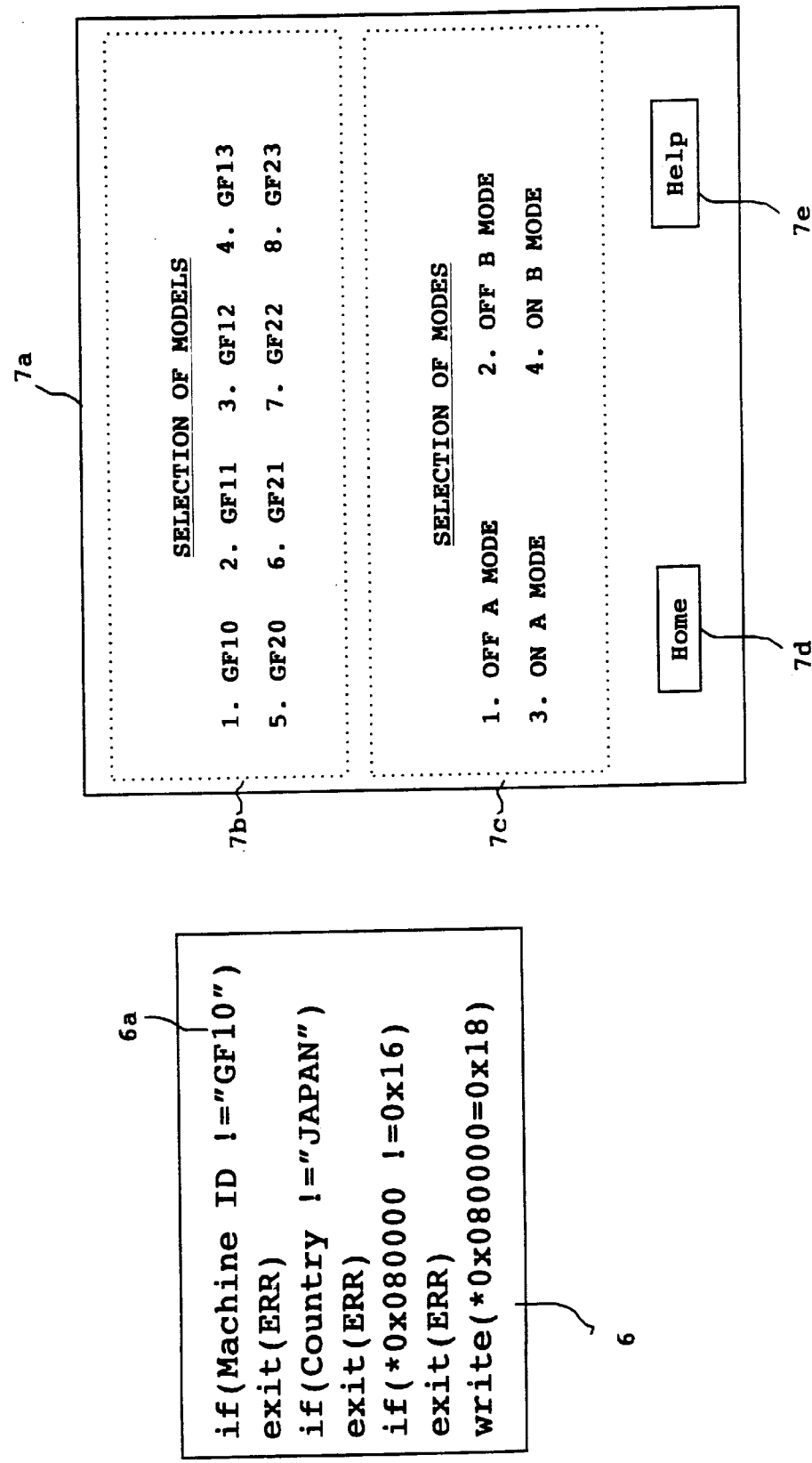

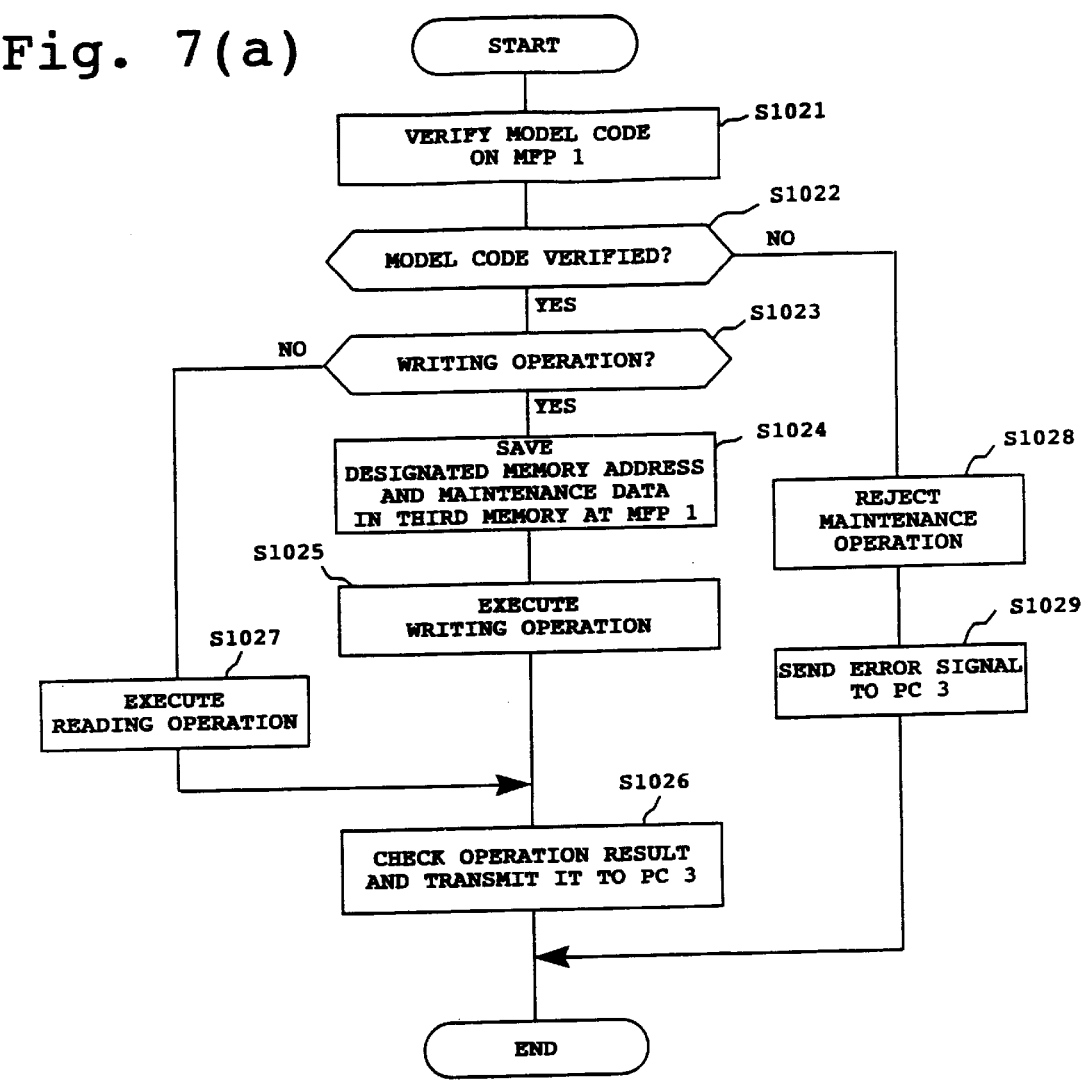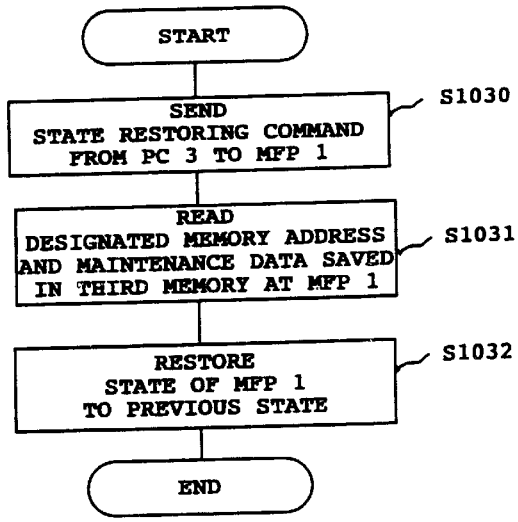

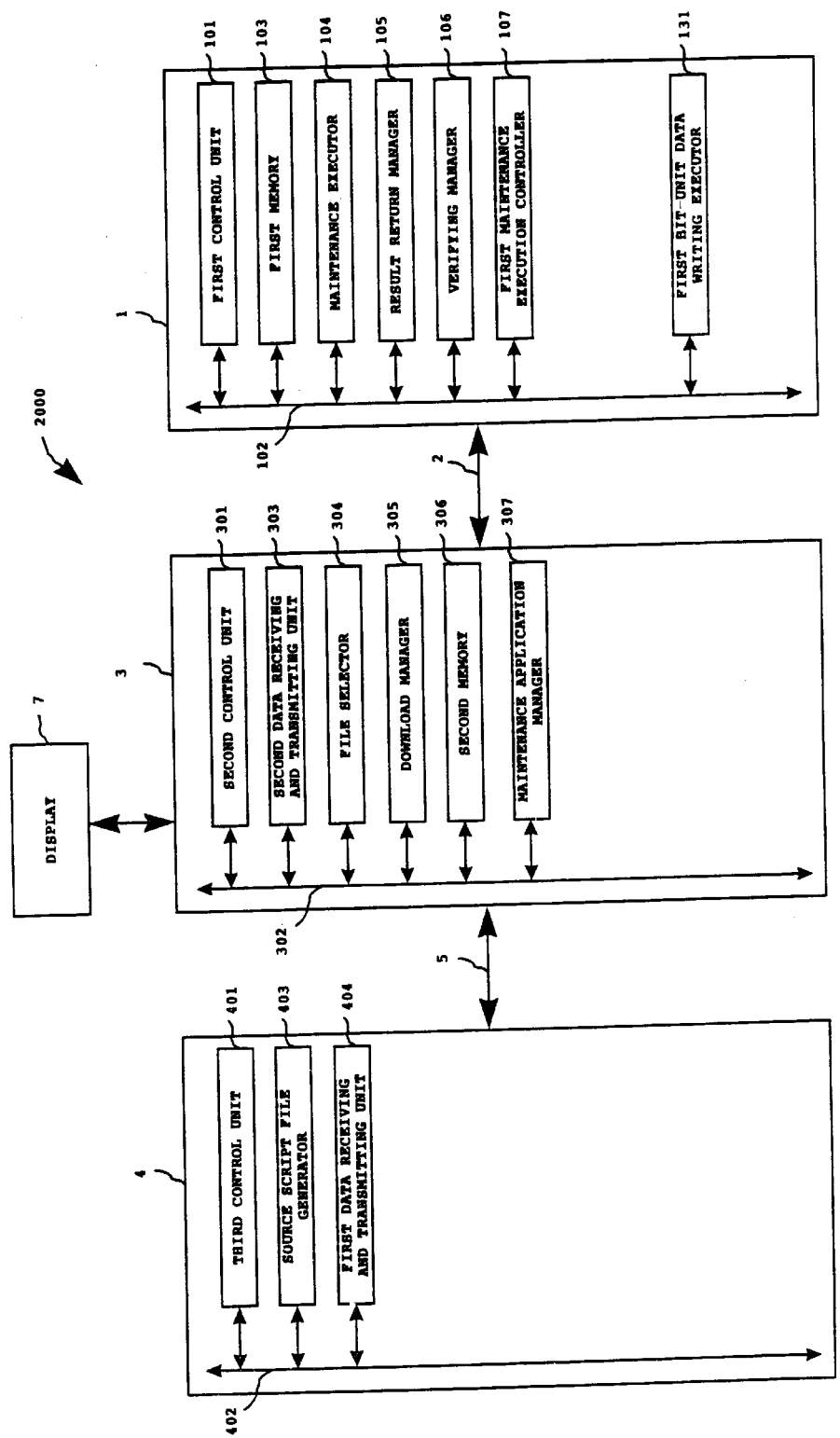

REMOTE MAINTENANCE SYSTEM AND METHOD FOR COMPUTER PERIPHERALS

BACKGROUND OF THE INVENTION

1. Field of said Invention

The present invention relates to a method and system for remote maintenance, and more particularly to a method and system that performs remote maintenance of computer peripherals such as printers, scanners, and so-called multi-function peripherals (MFPs).

2. Discussion of the Background

A so-called remote maintenance system has been developed for facsimile apparatuses and is capable of performing facsimile apparatus maintenance by use of a remote control operation. Generally, the remote maintenance system for the facsimile apparatus consists of a master computer located at a remote service depot for controlling the entire remote maintenance operation and a plurality of user systems, which are typically facsimile apparatuses located at user sites. The master computer and the user systems are linked via one or more private lines. In addition, the remote maintenance system uses specific facsimile communication protocols to enable the master computer to transmit a maintenance instruction to the designated facsimile apparatus, over the private lines. The remote maintenance system has been taking on an important role in facsimile apparatus maintenance by performing fault diagnosis, engineering change, and so forth.

In the field of computer peripherals, a so-called multi-function peripheral apparatus (MFP) has recently been developed to provide in one unit various functions performed by conventional single-function office machines such as a scanner, a printer, a copying machine, and a facsimile machine, for example. Connecting a digital copying machine, having both scanning and printing capabilities already therein, to a personal computer (PC) is one of the basic development ideas of the MFP. Obviously, the MFP based on the digital copying machine may be capable of performing various functions such as, for example, scanning, printing, copying, and so forth, and may even function as a facsimile apparatus if a facsimile controller and associated parts are additionally provided in the MFP.

As a recent trend, many of the aforementioned office machines including the MFP and other conventional single-function office machines have been arranged to store identification and control information in an erasable and programmable memory rather than in a read only memory which allows only one time data writing. This is simply to provide the capability of erasing and reprogramming the data. Generally, the stored identification and control information includes a model and version of the machine, a history of engineering changes that have been performed, and various programmed parameters for adjusting a machine condition, error statuses, and so forth. For example, the model and version of the machine may include various statuses, such as a machine configuration, a destination country for representing a required power source and a linguistic requirement, and so forth, so as to specify the exact type of machine.

Storing the identification and control information in an erasable and programmable memory provides advantages to a user and a maker of the apparatus. In many cases, maintenance can be performed just by reading and/or writing the aforementioned identification and control information into memory. The identification and control information can be referred to as maintenance data for the sake of clarity.

More specifically, when a user desires to set the machine at an arbitrary condition beyond the normally adjustable range, it may be achieved by changing appropriate portions of the programmed parameters included in the maintenance data. For example, in a case of printers, when a user needs to produce an output with an extremely dark print which is darker than the normally adjustable level of darkness, the machine can be adjusted to the desired condition by changing appropriate portions of the programmed parameters. In such a way, many of the MFP and other conventional single-function office machines can be adjusted since the functions, such as scanning, printing, copying, and facsimile communication, are controlled by the respective programmed parameters for adjusting their operating conditions.

If maintenance is performed just by reading and/or writing the maintenance data as described above, remote maintenance may be applied in a way similar to the aforementioned remote maintenance system for the facsimile apparatus. However, the remote maintenance system used for the facsimile apparatus is not necessarily appropriate for computer peripherals such as the MFP and the conventional single-function peripheral apparatus. A reason is that the specific requirements of the remote maintenance system for the facsimile apparatus, such as the private line, facsimile communication protocols, and so forth, are not technologies commonly used by most computer peripherals.

As described above, presently, there is no remote maintenance system for computer peripherals.

SUMMARY OF THE INVENTION

Accordingly, an object of the present invention is to provide a novel remote maintenance system for computer peripherals.

To achieve the above-mentioned object, the novel remote maintenance system for the computer peripherals according to the present invention includes at least one user system including at least one computer and at least one computer peripheral on which remote maintenance is performed and which includes a memory for storing maintenance data for identifying a model and for adjusting an operating condition of the apparatus, a source script file generator, located at a remote maintenance provider site and arranged to create a source script file including instructions for instructing at least one of operations of reading and writing the maintenance data, and a source script file transmitter located at the remote maintenance provider depot for transmitting the created source script file to a link method for connecting the source script file transmitter and the computer included in the user system. Further, the above-mentioned computer, included in the user system, includes an instruction selector for generating a model-specific script file by selecting an arbitrary instruction, a download manager for downloading the model-specific script file, a maintenance application executor for transmitting the model-specific script file to the computer peripheral. The above-mentioned computer peripheral, included in the user system, further includes a maintenance executor which executes at least one of the operations of reading and writing the maintenance data in accordance with the instruction in the model-specific script file upon a receipt of the model-specific script file, and a result feedback manager for transmitting the result of the maintenance operation to the computer.

The above-mentioned remote maintenance system may further include a verifying manager for verifying a model code included in the maintenance instruction against the identification data included in the memory of the computer peripheral.

The above-mentioned computer peripheral is preferably a multi-function peripheral (MFP).

The above-mentioned link method is preferably Internet.

The above-mentioned computer is a preferably a personal computer.

The above-mentioned memory of the computer peripheral may be an erasable programmable memory.

The above-mentioned memory of the computer peripheral may be a flash memory.

The above-mentioned memory of the computer peripheral may be a nonvolatile memory.

Other objects, features, and advantages of the present invention will become apparent from the following detailed description when read in conjunction with the accompanying drawings.

This application is based on Japanese Patent application No. JPAP08-244366 filed on Sep. 17, 1996. The entire contents of the Japanese application is hereby incorporated by reference.

BRIEF DESCRIPTION OF THE DRAWINGS

A more complete appreciation and understanding of the present invention and many of the attendant advantages thereof will be readily obtained by reference to the following detailed description when considered in connection with the accompanying drawings, wherein:

FIG. 3 is an illustration showing a part of an exemplary model-specific script file including data for identifying a model of a computer peripheral and an instruction for performing remote maintenance;

FIG. 4 is an illustration showing an exemplary page of a service depot site of the Internet displayed on a display unit of a computer at a user site so as to select a desired instruction;

FIGS. 7(a) and 7(b) are flowcharts for explaining a part of the operation of the second embodiment of the remote maintenance system shown in FIG. 6;

FIG. 10 is a block diagram of a fourth embodiment based on the first embodiment of the remote maintenance system shown in FIG. 1;

DESCRIPTION OF THE PREFERRED EMBODIMENTS

Figure 1:
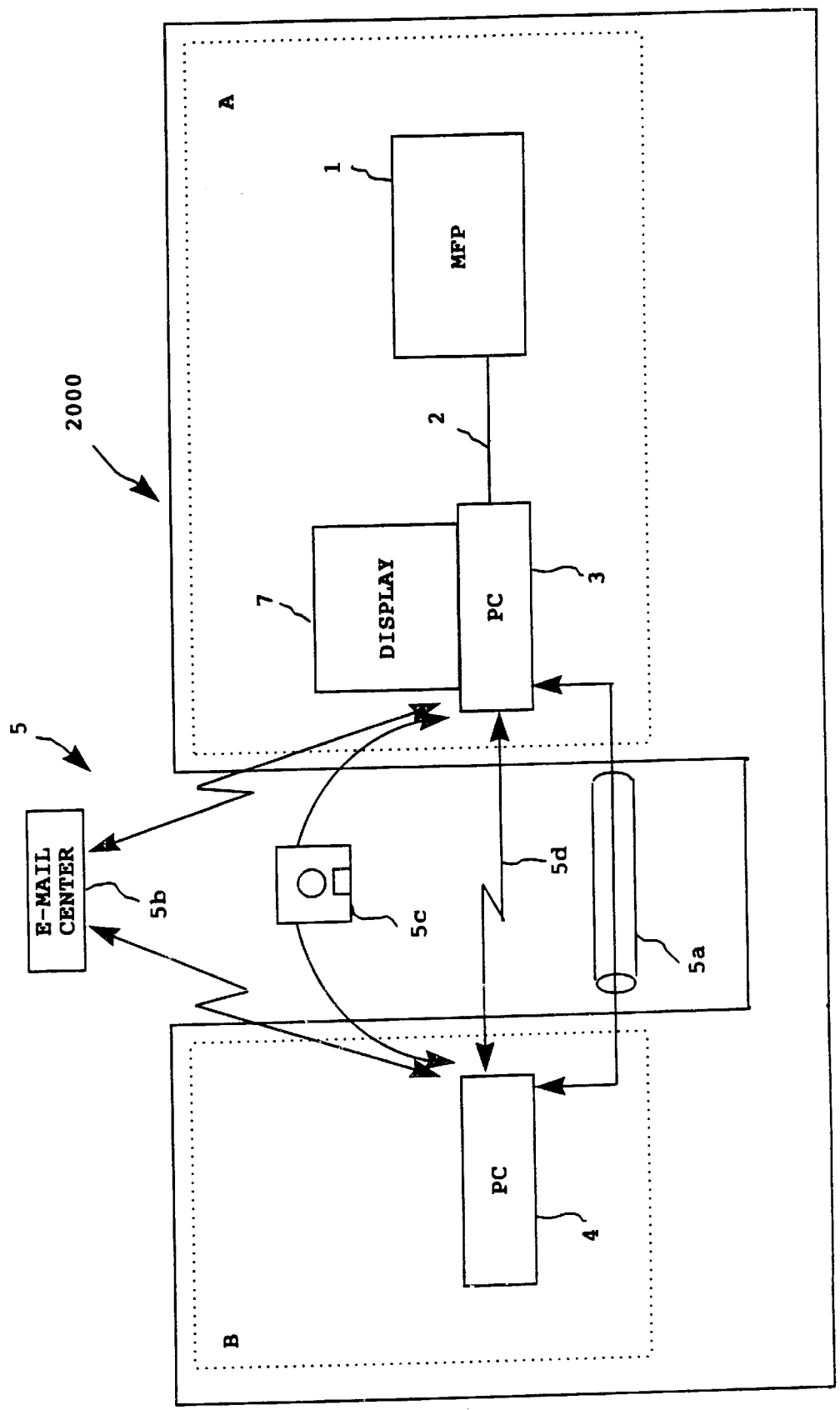
FIG. 1 is a schematic wiring diagram showing connections between the novel remote maintenance system as a first embodiment according to the present invention and various link methods.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

With respect to the drawings, like reference numerals designate identical or corresponding parts throughout the various views.

As shown in the schematic wiring diagram.of FIG. 1, a remote maintenance system 2000 for computer peripherals includes at least one user system, provided at a user site (indicated by a letter A in FIG. 1), including a multi-function computer-peripheral (MFP) 1, a personal computer (PC) 3, and an interface cable 2 for connecting the MFP 1 and the PC 3. The remote maintenance system 2000 further includes a personal computer (PC) 4 provided at a remote maintenance service depot site (indicated by a letter B in FIG. 1). The PCs 3 and 4 are preferably a standard personal computer. The PC 3 includes a display 7 and the PC 4 also includes a display (not shown).

The MFP 1 is an example of the computer peripherals which are to be an object of remote maintenance by the remote maintenance system 2000. Having no limitation in numbers to the user system including the MFP 1 and PC 3, the remote maintenance system 2000 is capable of performing remote maintenance of a relatively large number of MFPs 1 located at user sites. However, for the sake of convenience and clarity, only one user system having the MFP 1 and PC 3 at a user site is explained, as an example, and is so illustrated in all the relevant drawings.

The MFP 1 shown in FIG. 1 is based on a digital copying machine and, therefore, has basic functions of printing, scanning, and copying. The MFP 1 preferably includes a facsimile controller and the associated parts so as to be capable of performing a facsimile transmission over a public telephone line. Alternatively, other types of multi-function peripherals such as a printer-based MFP as well as various conventional single-function devices such as a printer, a scanner, and the like may be an object of the remote maintenance. The interface cable 2 for connecting the MFP 1 and PC 3 conforms to the Centronics interface standard, for example.

The PC 3 connected to the MFP 1 at the user site is arranged to be linked to the PC 4 located at the remote maintenance service depot, so that the PC 4 can communicate with the user system of the PC 3 and MFP 1 to perform the remote maintenance thereto. A preferable link method 5 may be selectively used from among various methods such as, for example, Internet 5a, an electronic mail system 5b for a PC network, and a public telephone line 5d. A floppy-disk 5c can also be one of the possible alternatives for the link method 5.

The MFP 1, thus included in the remote maintenance system 2000 at the user site, includes: a scanner unit (not shown) for reading an image from originals by a photoelectric conversion method and for generating an image signal; a printer (not shown) for producing an output image on a recording sheet in accordance with the image signal; a facsimile and data modem (not shown) connected to a telephone line for transmitting and receiving data through the telephone line; and an erasable programmable type memory, which is explained below, for storing various kinds of data to be used for the remote maintenance.

Figure 2:
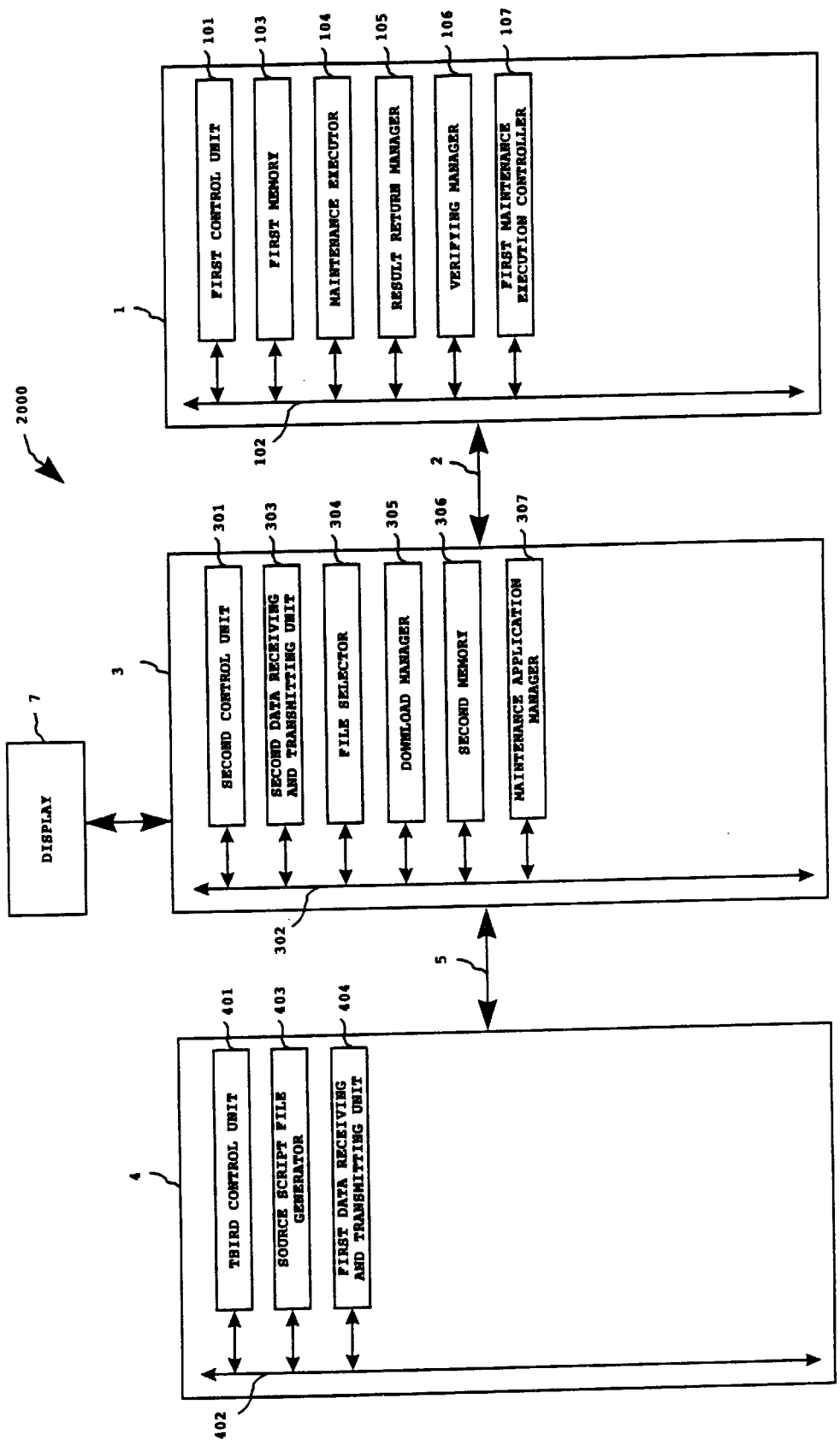
FIG. 2 is a block diagram of the first embodiment of the remote maintenance system shown in FIG. 1.

The above-mentioned erasable programmable type memory is referred to as a first memory 103 (FIG. 2). The data to be stored in the first memory 103 is referred to as maintenance data and represents, for example, a machine model, a machine version, a history of engineering changes that have been performed, various programmed parameters for adjusting an operating condition of the machine, various error statuses, and so forth. The machine model generally identifies a configuration of the machine, a destination country representing a required power source and a linguistic requirement. The machine version generally identifies a time and place of production, an engineering level, and so forth.

Preferably, one of a nonvolatile RAM (random access memory), a nonvolatile ROM (read only memory), a flash ROM (read only memory), and an EEPROM (electrically erasable programmable read only memory) is used for the first memory 103 for storing the maintenance data related to the MFP 1.

Next, a detailed configuration of a first embodiment of the remote maintenance system 2000 is explained with reference to FIG. 2. As shown in FIG. 2, each of the MFP 1, PC 3, and PC 4 includes a respectively similar set of ordinary PC built-in units for performing computing. Each of the units include a CPU (central processing unit), a ROM (read only memory), a RAM (random access memory), associated circuits, and so on, and are collectively referred to as a first control unit 101, a second control unit 301, and a third control unit 401, respectively. Further, each of the MFP 1, PC 3, and PC 4 includes respectively similar internal system bus lines 102, 302, and 402, respectively.

The PC 4 in FIG. 2 of the remote maintenance system 2000 further includes a source script file generator 403 that generates a source script file (not shown) including a plurality of scripts forming information and instructions for the purpose of performing remote maintenance on the MFP 1 at the user site.

Since it is possible that a large number of MFP 1 model variations are produced for various reasons such as differences in required power sources, for example, the source script file is generated preferably for each specific model of the MFP 1. And a model of the MFP 1 at a user site is necessarily specified in a way as described below. Such a source script file is subjected to a selection step before being forwarded to the MFP 1. A resultant file selected through the selection step is referred to as a model-specific script file 6 (FIG. 3). The PC 4 further includes a first data receiving and transmitting unit 404 for transmitting the source script file via the link method 5 and for receiving information via the link method 5.

Most of the instructions included in the source script file are for reading or writing data at a designated location of memory. As described above, the maintenance data are stored in an erasable programmable memory such as first memory 103 of the MFP 1. Accordingly, any part of the maintenance data in the first memory 103 can be accessed so as to be read or written by addressing the first memory 103 with appropriate addressing data.

The contents of the source script file needs to be hidden from users, and the source script file is normally written in an encrypted form so as to avoid a situation in which the user changes the maintenance data stored in the memory using the contents of the source script file. An example of the model-specific script file 6 shown in FIG. 3 is translated into a readable form for the purpose of explaining the script file.

The model-specific script file 6 of FIG. 3 includes steps of instructing: to send an error signal and finish the process if the model identification code of the MFP 1 is not identical to a code of GF10 6a; to send an error signal and finish the process if the country identification code of the MFP 1 is not identical to a code of Japan; to send an error signal and finish the process if data at the address 80000H is not equal to 16H; and, to write the data 18H at the address 80000H.

The model-specific script file 6 includes a memory address and replacement data for instructions of reading and writing data as the example shows in FIG. 3.

As also shown in FIG. 3, the model-specific script file 6 includes the model code, i.e. GF10 6a, for performance of the remote maintenance. By verifying the information of the model, the MFP 1 can perform only appropriate items of the remote maintenance and avoid any inappropriate items of the same. On a demand basis, the model-specific script file 6 may include information indicating the model code together with a few limited numbers of other model codes for the remote maintenance, at the same time.

In addition, the country code also specifies a model for the remote maintenance. In this case, the country code represents the voltage and frequency of the required power sources and a linguistic requirement if any, for example.

The PC 3 of FIG. 2 further includes a second data receiving and transmitting unit 303 for receiving data and transmitting data via the link method 5, a file selector 304 for selecting script files necessary for the MFP 1 connected thereto from among the source script file sent from the PC 4 via the link method 5. The PC 3 further includes a download manager 305 for downloading the model-specific script file 6 and a second memory 306 to which the downloaded file 6 is stored.

When an organization of the remote maintenance service depot has a home page on the Internet 5a for the purpose of performing the remote maintenance and provides necessary information for the remote maintenance using this home page, the user can use Internet 5a as the link method 5, for example. In this case, the file selector 304 of the PC 3 proceeds the selection step using an exemplary interactive page 7a of the Internet which is displayed on the display 7 of the PC 3 as shown in FIG. 4.

The exemplary interactive page 7a of FIG. 4 includes a model selection section 7b, for example, for providing information of various candidates of models to be selected by the user, and a mode selection section 7c, for example, for providing information of various candidates of modes to be selected by the user. The interactive page 7a further includes a home button 7d for returning to a home page of the Internet site and a help page button 7e for jumping to a help page provided by the Internet site. As a result of the selections, necessary script files are selected and downloaded into the second memory 306, and the model-specific script file 6 is generated, as described above.

The PC 3 further includes a maintenance application manager 307 for transferring the thus-generated model-specific script file 6 to the MFP 1 upon receiving a user instruction which is made after the model-specific script file has been downloaded into the second memory 306.

The MFP 1 further includes a maintenance executor 104 for determining whether the model-specific script file 6 instructs an operation of reading or writing the maintenance data at the designated memory address and, accordingly, for executing at least one of the operations of reading and writing the maintenance data which is stored in the first memory 103 of the MFP 1 at the designated memory address, when the model-specific script file 6 is transferred to the MFP 1 by the maintenance application manager 307 of the PC 3.

The MFP 1 further includes a result return manager 105 for determining whether the performance of the maintenance executor 104 of the MFP 1 is successfully completed and for returning the determination result to the PC 3.

The MFP 1 further includes a verifying manager 106 for verifying the model code, GF10 6a, for example, included in the instruction of the model-specific script file 6 against the model identification code included in the maintenance data stored in the first memory 103 of the MFP 1. The model code verification by the verifying manager 106 needs to be performed before the maintenance executor 104 starts the read or write operation in order to assure that the model-specific script file 6 correctly fits the MFP 1.

The MFP 1 further includes a first maintenance execution controller 107 for determining whether the model code, GF10 6a, is verified against the model identification code by the verifying manager 106, for instructing the maintenance executor 104 to continue the operation when the verification function is completed successfully, and for instructing the maintenance executor 104 to stop the operation when the verification function is completed unsuccessfully. When the verification function is completed unsuccessfully, the first maintenance execution controller 107 sends an error signal to the PC 3.

By arranging the structure as described above, the remote maintenance system 2000 of FIG. 1 can perform remote maintenance to the MFP 1 connected to the PC 3.

Next, an operation of the first embodiment of the remote maintenance system 2000 is explained with reference to FIGS. 5(a) and 5(b). In Step S1001 in FIG. 5(a), a source script file is created by the source script file generator 403 of the PC 4 at the remote maintenance service depot. Then, the source script file is transmitted to Internet 5a in Step S1002 by the first receiving and transmitting unit 404.

At the user site, the user observes the source script file transmitted from Internet 5a on the display 7 of the PC 3, in Step S1003. Then, in Step S1004, model-specific script file 6 is generated by the file selector 304 of the PC 3 and then downloaded into the second memory 306 of the PC 3 by the download manager 305 of the PC 3.

After a completion of downloading, the maintenance application manager 307 of the PC 3 turns a machine mode into a maintenance mode in Step S1005. Then, in Step S1006, the maintenance application manager 307 transmits the model-specific script file 6 to the MFP 1. Then, in Step S1007, the maintenance executor 104 of the MFP 1 receives the model-specific script file 6 and executes an operation in accordance with an instruction included in the model-specific script file. What the maintenance executor 104 can execute is an operation of reading or writing the maintenance data which is stored in the first memory 103 of the MFP 1, at the memory address designated by the instruction of the model-specific script file 6. After a completion of the maintenance operation in accordance with the instruction instructed by the model-specific script file 6, the PC 3 indicates the result of the operation on the display 7 in Step S1008.

Figure 5A:
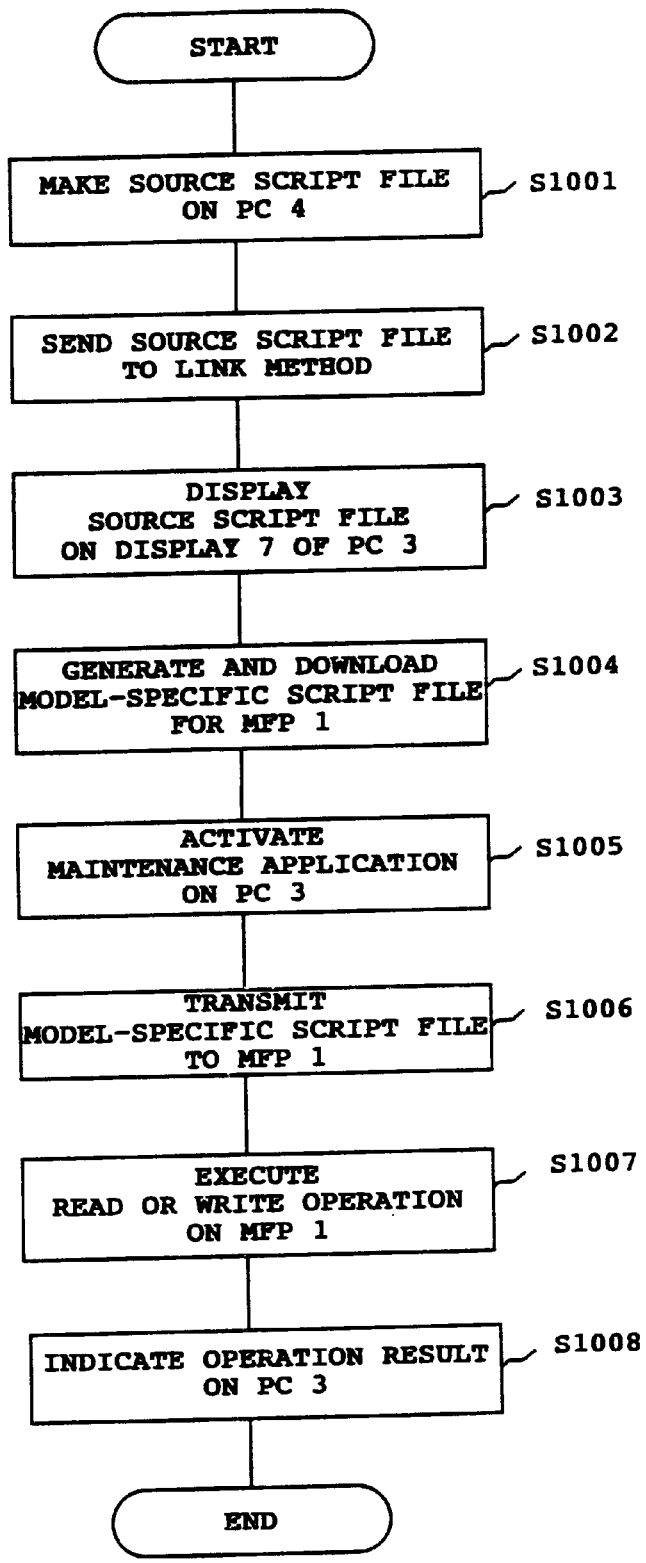
FIGS. 5(a) and 5(b) are flowcharts for explaining an operation of the first embodiment of the remote maintenance system shown in FIG. 1.
Figure 5B:
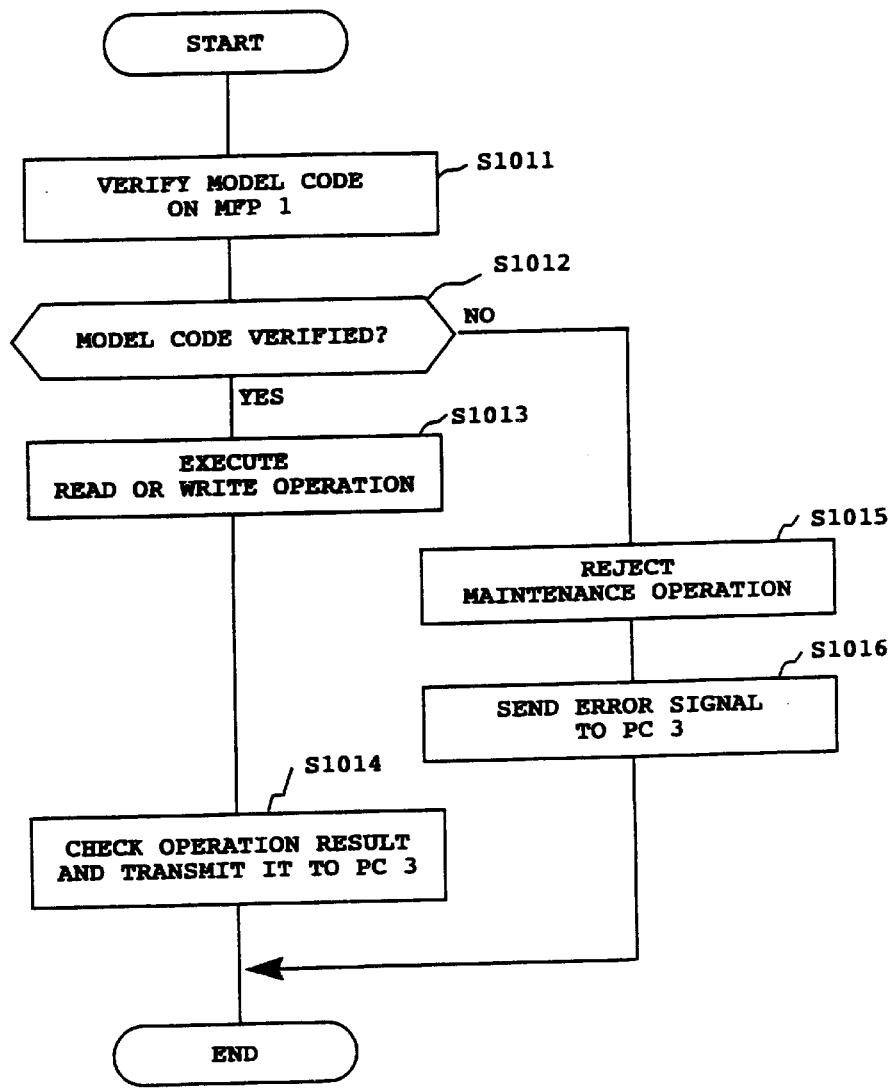

The flowchart of FIG. 5(b) shows a detail of Step S1007 of FIG. 5(a). In Step S1011 of 5(b), the verifying manager 106 verifies the model code (i.e. GF10 6a) included in the the model-specific script file 6 against the model identification code included in the maintenance data stored in the first memory 103 of the MFP 1. Then, in Step S1012, the result return manager 105 determines whether the model code (i.e. GF10 6a) has been verified correctly by the verifying manager 106.

When the model code (i.e. GF10 6a) is verified correctly and the result of Step S1012 is YES, the process proceeds to Step S1013. In Step S1013, the first maintenance execution controller 107 instructs the maintenance executor 104 to continue the read or write operation. Then, in Step S1014, the result return manager 105 returns the determination result of the verification of the model code to the PC 3. The process is then ended.

When the model code (i.e. GF10 6a) is not verified correctly and the result of Step S1012 is NO, the process proceeds to Step S1015. In Step S1015, the first maintenance execution controller 107 instructs the maintenance executor 104 to stop the read or write operation. Then, in Step S1016, the first maintenance execution controller 107 sends an error signal to the PC 3. The process is then ended.

In the way as described above, the remote maintenance system 2000 of FIG. 1 can perform remote maintenance to the MFP 1 connected to the PC 3.

Figure 6:
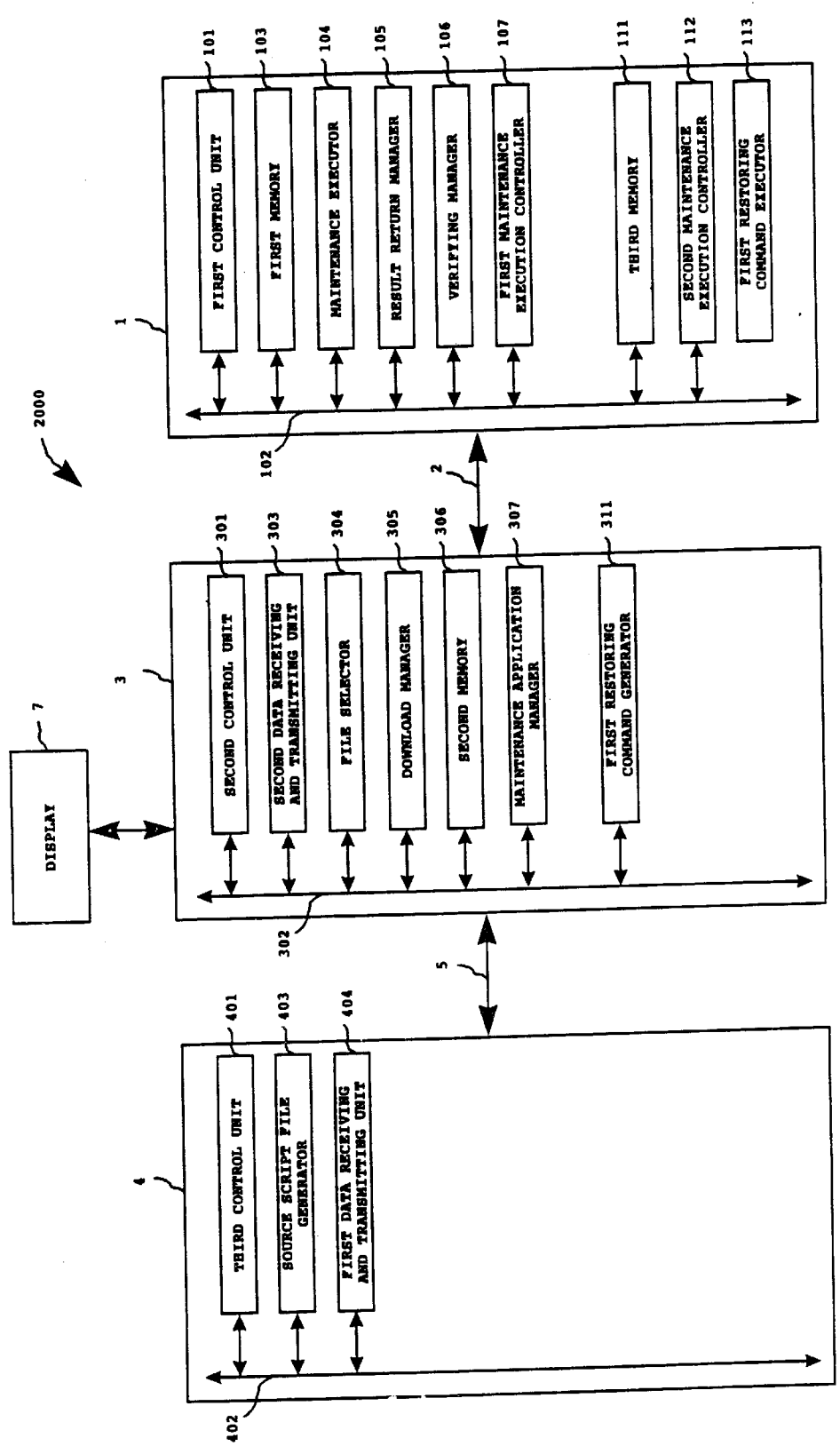
FIG. 6 is a block diagram of a second embodiment based on the first embodiment of the remote maintenance system shown in FIG. 1.

Next, the second embodiment of the remote maintenance system 2000 is explained with reference to FIG. 6, in which parts similar to those previously described with reference to FIG. 2 are denoted by the same reference numerals. The structure of the second embodiment of the remote maintenance system 2000 shown in FIG. 6 is similar to that of the first embodiment shown in FIG. 2, except for several parts added to the second embodiment. Among the parts added to the second embodiment, a third memory 111 for storing previous state of the maintenance data of the MFP 1, a second maintenance execution controller 112, and a first restoring command executor 113 are provided in the MFP 1, and a first restoring command generator 311 is provided in the PC 3.

The first restoring command generator 311 included in the PC 3 of FIG. 6 generates a state restoring command for restoring the state of the maintenance data of the MFP 1 stored in the first memory 103 of the MFP 1, at an arbitrary time upon receiving a user instruction, and sends the state restoring command to the MFP 1. The user instruction is normally given after an operation for writing the maintenance data of the MFP 1 stored in the first memory 103 has been performed by the maintenance executor 104 of the MFP 1.

The second maintenance execution controller 112 provided in the MFP 1 of FIG. 6 determines whether the model-specific script file 6 instructs an operation of writing the maintenance data of the MFP 1 stored in the first memory 103 of the MFP 1 at the designated memory addresses included in the instruction of the model-specific script file 6, when the model code is verified correctly by the verifying manager 107. The second maintenance execution controller 112 also arranges to save the present state of the maintenance data and the corresponding memory addresses into the third memory 111 before activating the maintenance executor 104 to execute the instructed operation, when determining that the given instruction is to write the maintenance data. After saving the memory addresses and the present state of the maintenance data at the designated memory addresses, which present state is then regarded as a previous state of the maintenance data of the MFP 1, the second maintenance execution controller 112 activates the maintenance executor 104 to execute the instructed operation.

The first restoring command executor 113 provided in the MFP 1 restores the state of the maintenance data stored in the first memory 103 to the previous state in accordance with the addresses and the data saved in the third memory 111, upon receiving the state restoring command sent from the first restoring command generator 311.

By arranging the structure as described above, the remote maintenance system 2000 of FIG. 6 can perform remote maintenance and restore the state of the maintenance data of the MFP 1 to the previous state.

Next, a state restoring operation according to the second embodiment of the remote maintenance system 2000 is explained with reference to FIGS. 7(a) and 7(b) which show the operations of saving the state data and restoring the state data, respectively. A rough flow of the entire operation of the remote maintenance performed by the second embodiment of the remote maintenance system 2000 is similar to that of the first embodiment shown in FIG. 5(a), except for Step S1007 of which detail is shown in FIG. 5(b). FIGS. 7(a) and 7(b) replace FIG. 5(b) because of the added state restoring operation.

In Step S1021 of FIG. 7(a), the verifying manager 106 verifies the model code (i.e. GF10 6a) included in the model-specific script file 6 against the model identification code included in the maintenance data stored in the first memory 103 of the MFP 1. Then, in Step S1022, the first maintenance execution controller 107 determines whether the model code (i.e. GF10 6a) has been verified correctly by the verifying manager 106.

When the model code (i.e. GF10 6a) is verified correctly and the result of Step S1022 is YES, the process proceeds to Step S1023. In Step S1023, the second maintenance execution controller 112 determines whether the model-specific script file 6 instructs an operation of writing the maintenance data which is stored in the first memory 103, at the designated memory addresses. When the instruction is a writing operation and the result of Step S1023 is YES, the process proceeds to Step S1024 and the second maintenance execution controller 112 arranges to save the present state of the maintenance data of the MFP 1 and the corresponding memory addresses into the third memory 111, in Step S1024. Then, in Step S1025, the first maintenance execution controller 107 instructs the maintenance executor 104 to perform the writing operation. Then, in Step S1026, the result return manager 105 analyzes the performance of the reading or writing operation and returns the result of the analysis to the PC 3. The process is then ended.

When the instruction is a reading operation and the result of Step S1023 is NO, the process proceeds to Step S1027 and the first maintenance execution controller 107 instructs the maintenance executor 104 to perform the reading operation. Then, the process proceeds to Step S1026 and the result return manager 105 analyzes the performance of the reading or writing operation and returns the result of the analysis to the PC 3. The process is then ended.

When the model code (i.e. GF10 6a) is not verified correctly and the result of Step S1022 is NO, the process proceeds to Step S1028. In Step S1028, the first maintenance execution controller 107 instructs the maintenance executor 104 to reject the instruction of the model-specific script file 6. Then, in Step S1029, the first maintenance execution controller 107 sends an error signal to the PC 3. The process is then ended.

In Step S1030 of FIG. 7(b), a state restoring command is generated, and transmitted to the MFP 1 by the first restoring command generator 311 upon an instruction from the user. Then, in Step S1031, the first restoring command executor 113 reads the memory addresses and the previous state of the maintenance data of the MFP 1 stored in the third memory 111. Then, in Step S1032, the first restoring command executor 113 writes the maintenance data of the first memory 103 with the read previous state data and memory addresses. Then, the process is ended.

In this way as described above, the remote maintenance system 2000 of FIG. 6 can perform remote maintenance and restore the state of the maintenance data of the MFP 1 to the previous state.

Figure 8:
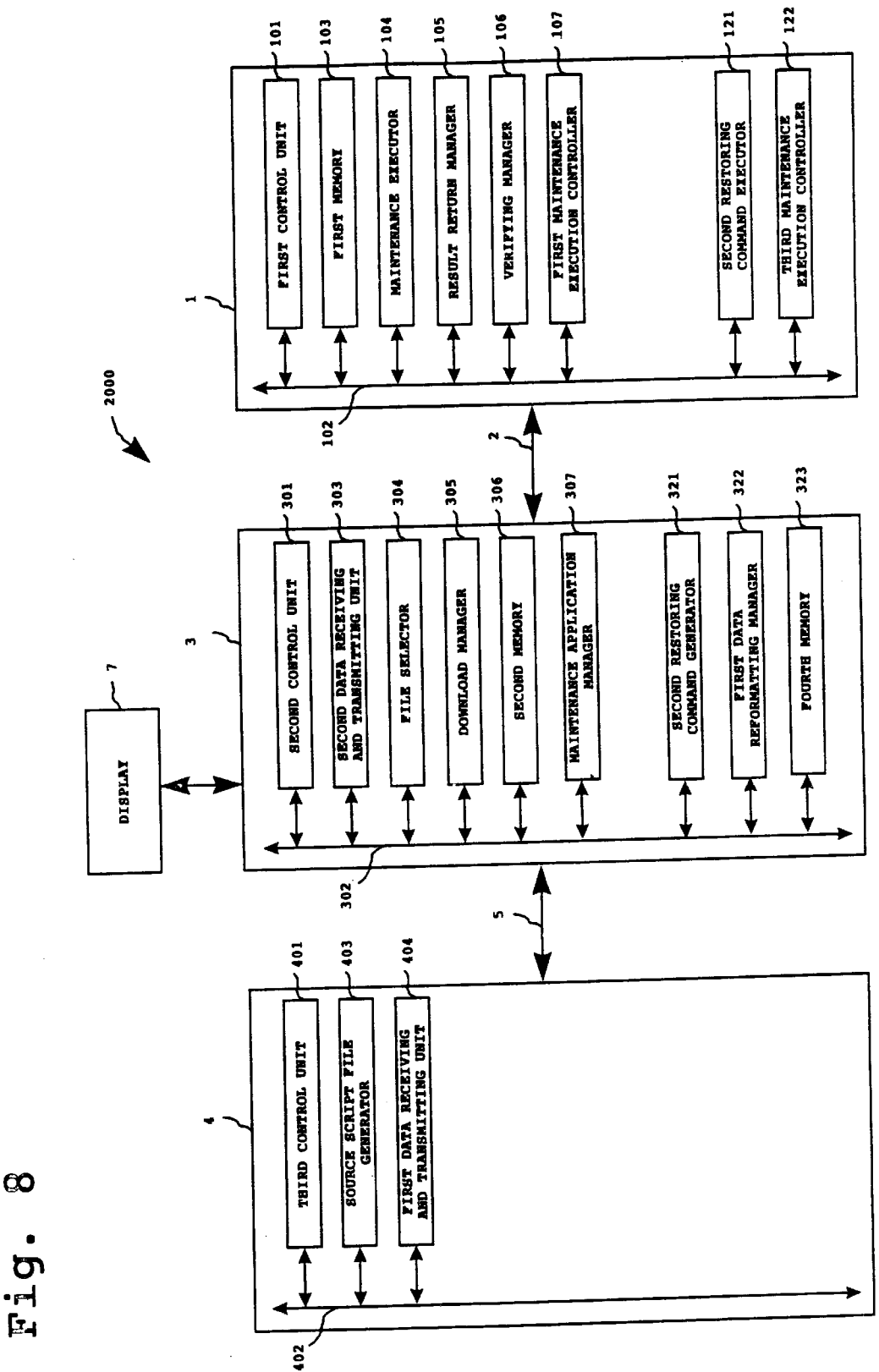
FIG. 8 is a block diagram of a third embodiment based on the first embodiment of the remote maintenance system shown in FIG. 1.

Next, the third embodiment of the remote maintenance system 2000 is explained with reference to FIG. 8, in which parts similar to those previously described with reference to FIG. 2 are denoted by the same reference numerals. The structure of the third embodiment of the remote maintenance system 2000 shown in FIG. 8 is similar to that of the first embodiment shown in FIG. 2, except for several parts added to the second embodiment. Among the added parts to the third embodiment, a second restoring command executor 121 and a third maintenance execution controller 122 are provided in the MFP 1, and a second restoring command generator 321, a first data reformatting manager 322, and a fourth memory 323 for storing a plurality of the previous states of the maintenance data of the MFP 1 are provided in the PC 3. The fourth memory 323 preferably is a larger capacity memory such as a hard disk, for example, for storing a relatively large number of previous states of the maintenance data.

The third maintenance execution controller 122 provided in the MFP 1 of FIG. 8 determines whether the model-specific script file 6 instructs an operation of writing the maintenance data of the MFP 1 stored in the first memory 103 of the MFP 1 at the designated memory addresses included in the instruction of the model-specific script file 6, when the model code is verified correctly by the verifying manager 107. The third maintenance execution controller 122 also transmits the present state of the maintenance data and the memory addresses to the PC 3 before activating the maintenance executor 104 to execute the instructed operation, when determining that the given instruction is to write the maintenance data. After transmitting the memory addresses and the present state of the maintenance data, which is then regarded as a previous state of the maintenance data of the MFP 1, to the PC 3, the third maintenance execution controller 122 activates the maintenance executor 104 to execute the instructed operation.

The state and memory address data transmitted from the MFP 1 are reformatted into a predetermined file form and then transmitted to the fourth memory 323, by the first data reformatting manager 322.

The second restoring command generator 321 generates a state restoring command for restoring the state of the maintenance data of the MFP 1 stored in the first memory 103 of the MFP 1, at an arbitrary time upon receiving a user instruction, and sends the state restoring command to the MFP 1. In this case, the second restoring command generator 321 arranges to put the previous state and memory address data from the fourth memory 323 into the state restoring command. The user's instruction is normally given after an operation of writing the maintenance data of the MFP 1 into the first memory 103 has been performed by the maintenance executor 104 of the MFP 1.

The second restoring command executor 121 provided in the MFP 1 restores the state of the maintenance data stored in the first memory 103 to the previous state in accordance with the addresses and the data included in the state restoring command, upon receiving the state restoring command sent from the second restoring command generator 321.

By arranging the structure as described above, the remote maintenance system 2000 of FIG. 8 can perform remote maintenance and restore the state of the maintenance data of the MFP 1 to any one of a relatively large number of the stored previous states.

Figure 9A:
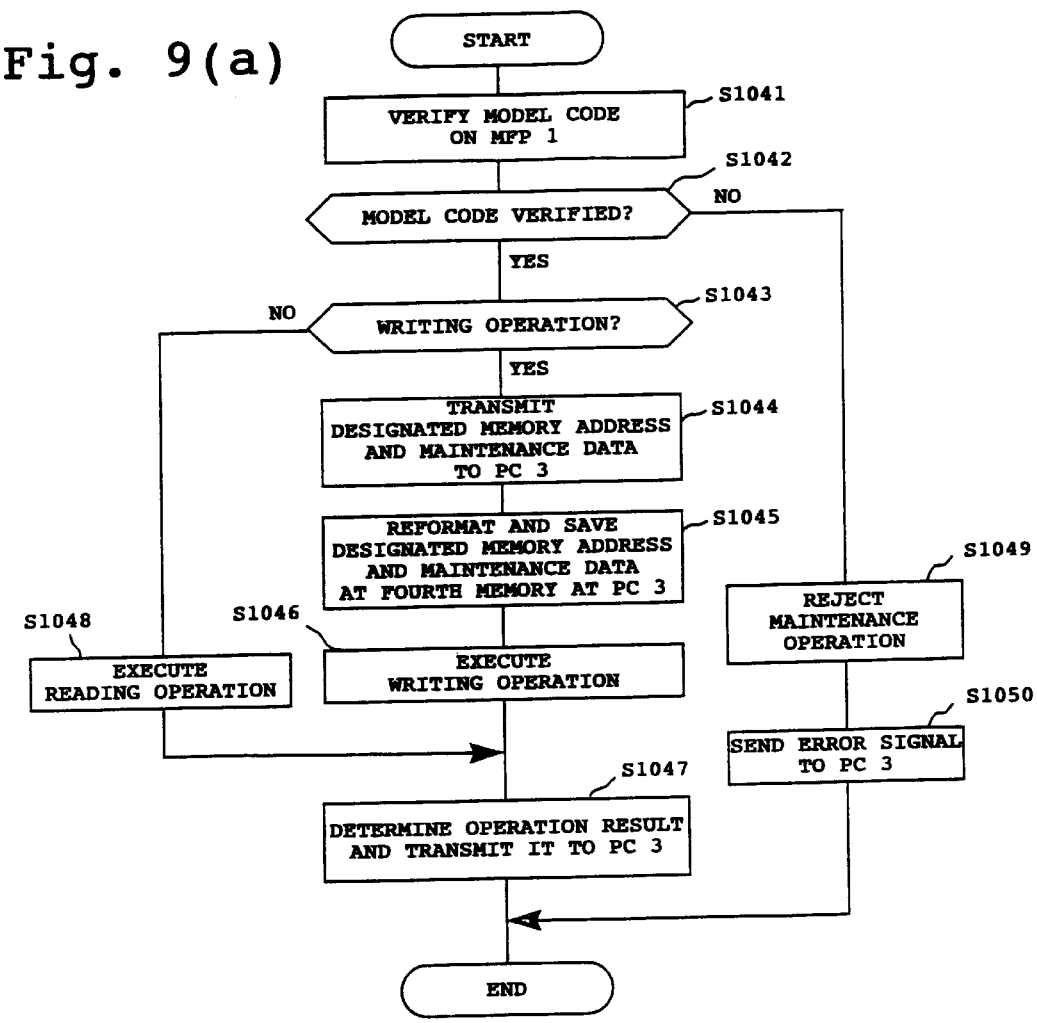
FIGS. 9(a) and 9(b) are flowcharts each for explaining a part of the operation of the third embodiment of the remote maintenance system shown in FIG. 8.
Figure 9B:
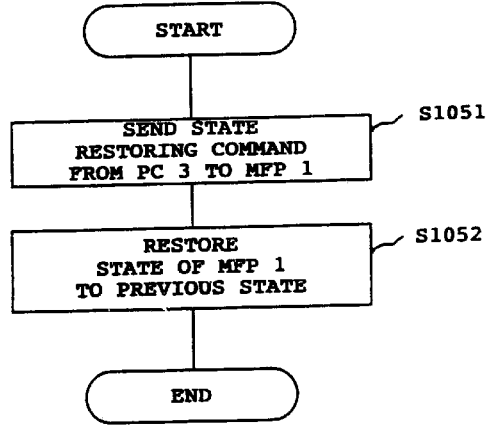

Next, a state restoring operation by the third embodiment of the remote maintenance system 2000 is explained with reference to FIGS. 9(a) and 9(b) showing the operations of saving the state data and restoring the state, respectively. A rough flow of the entire operation of the remote maintenance performed by the third embodiment of the remote maintenance system 2000 is similar to that of the first embodiment shown in FIG. 5(a), except for Step S1007 of which detail is shown in FIG. 5(b). FIGS. 9(a) and 9(b) replace FIG. 5(a) because of the added state restoring operation.

In Step S1041 of FIG. 9(a), the verifying manager 106 verifies the model code (i.e. GF10 6a) included in the model-specific script file 6 against the model identification code included in the maintenance data stored in the first memory 103 of the MFP 1. Then, in Step S1042, the first maintenance execution controller 107 determines whether the model code (i.e. GF10 6a) has been verified correctly by the verifying manager 106.

When the model code (i.e. GF10 6a) is verified correctly and the result of Step S1042 is YES, the process proceeds to Step S1043. In Step S1043, the third maintenance execution controller 122 determines whether the model-specific script file 6 instructs a writing operation of the maintenance data of the MFP 1 into the first memory 103 of the MFP 1, at the designated memory addresses.

When the instruction is determined as a writing operation and the result of Step S1043 is YES, the third maintenance execution controller 122 transmits the present state of the maintenance data of the MFP 1 and the designated memory addresses to the PC 3, in Step S1044. Then, in Step S1045, the first data reformatting manager 322 of the PC 3 reformats the transmitted maintenance data and. designated memory addresses into the predetermined file form. Then, in Step S1046, the first maintenance execution controller 107 instructs the maintenance executor 104 to perform the writing operation. Then, in Step S1047, the result return manager 105 analyzes the performance of the reading or writing operation and returns the result of the analysis to the PC 3. The process is then ended.

When the instruction is determined as a reading operation and the result of Step S1043 is NO, the process proceeds to Step S1048 and the first maintenance execution controller 107 instructs the maintenance executor 104 to perform the reading operation. Then, in Step S1047, the result return manager 105 analyzes the performance of the reading or writing operation and returns the result of the analysis to the PC 3. The process is then ended.

When the model code (i.e. GF10 6a) is not verified correctly and the result of Step S1042 is NO, the process proceeds to Step S1049. In Step S1049, the first maintenance execution controller 107 instructs the maintenance executor 104 to reject the instruction of the model-specific script file 6. Then, in Step S1050, the first maintenance execution controller 107 sends an error signal to the PC 3. The process is then ended.

In Step S1051 of FIG. 9(b), a state restoring command is generated, and transmitted to the MFP 1 by the second restoring command generator 321 upon an instruction from the user. In this case, the second restoring command generator 321 arranges to include the designated memory addresses and the previous state of the maintenance data of the MFP 1 stored in the fourth memory 323 of the PC 3. Then, in Step S1052, the second restoring command executor 121 writes the maintenance data to the first memory 103 using the previous state data and designated memory addresses included in the state restoring command. Then, the process is ended.

In this way as described above, the remote maintenance system 2000 of FIG. 8 can perform remote maintenance and restore the state of the maintenance data of the MFP 1 to any one of a relatively large number of stored previous states.

Next, the fourth embodiment of the remote maintenance system 2000 is explained with reference to FIG. 10, in which parts similar to those previously described with reference to FIG. 2 are denoted by the same reference numerals. The structure of the fourth embodiment of the remote maintenance system 2000 shown in FIG. 10 is similar to that of the first embodiment shown in FIG. 2, except for a first bit-unit data writing executor 131 which is added to the MFP 1.

There is a type of source script file instruction for instructing reading or writing data in a bit unit at a designated bit of a memory. This instruction performs efficiently in a case in which only one or a few bits of data are needed to be read or written, in comparison with a byte-unit-based operation.

The first bit-unit data writing executor 131 provided in the MFP 1 determines whether the instruction of the model-specific script file 6 is a writing operation, and also whether the instruction of the model-specific script file 6 is a bit-unit data writing operation.

By arranging the structure as described above, the remote maintenance system 2000 of FIG. 10 can perform remote maintenance in which data can be written efficiently in a bit unit in the first memory 103 of the MFP 1.

Next, the bit-unit data writing operation by the fourth embodiment of the remote maintenance system 2000 is explained with reference to FIG. 11. A rough flow of the entire operation of the remote maintenance performed by the fourth embodiment of the remote maintenance system 2000 is similar to that of the first embodiment shown in FIG. 5(a), except for Step S1007 of which detail is shown in FIG. 5(b). That is, FIG. 11 replaces FIG. 5B.

Figure 11:
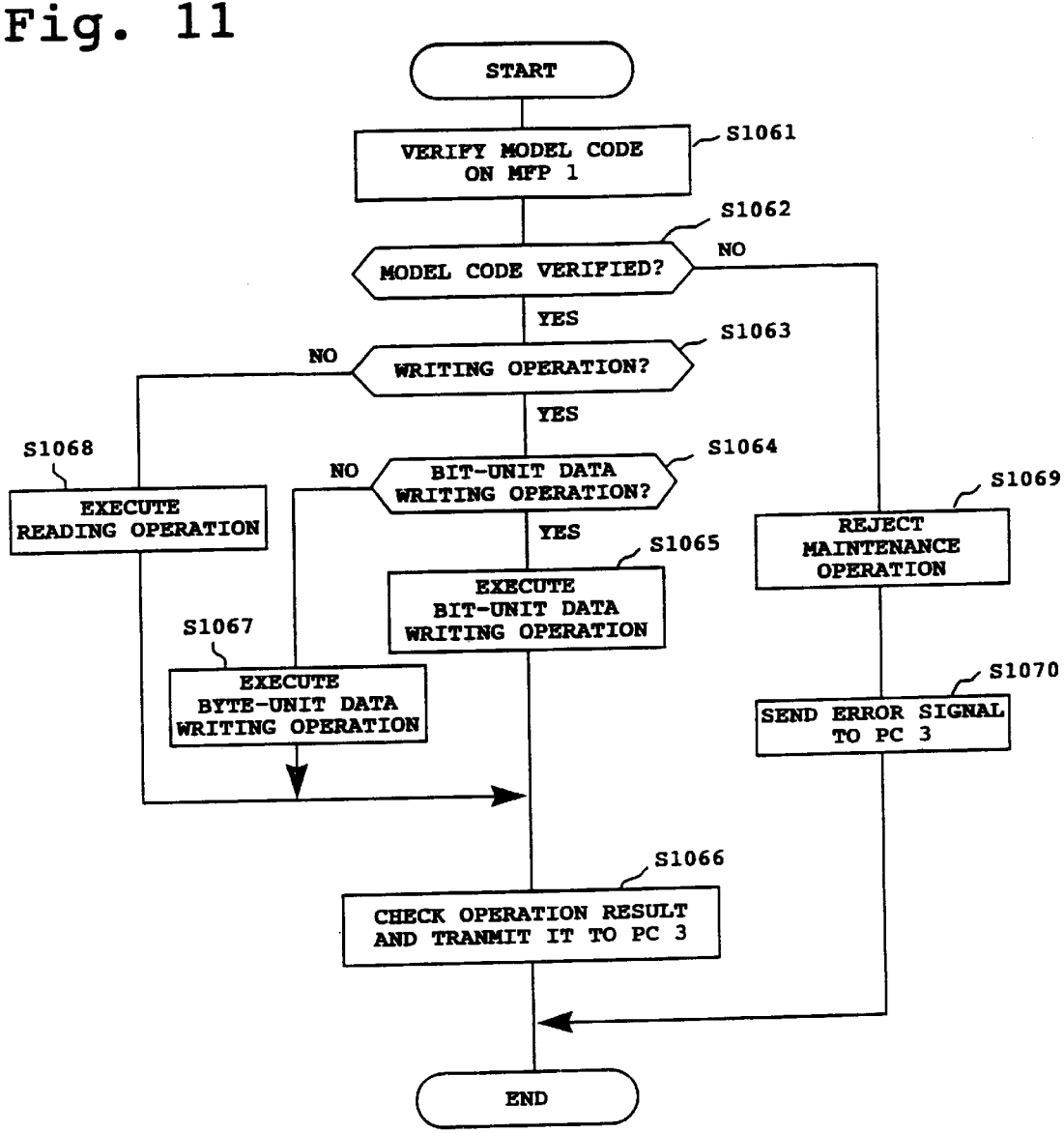
FIG. 11 is a flowchart for explaining a part of the operation of the fourth embodiment of the remote maintenance system shown in FIG. 10.

In Step S1061 of FIG. 11, the verifying manager 106 verifies the model code (i.e. GF10 6a) included in the model-specific script file 6 against the model identification code included in the maintenance data stored in the first memory 103 of the MFP 1. Then, in Step S1062, the first maintenance execution controller 107 determines whether the model code (i.e. GF10 6a) is verified correctly by the verifying manager 106.

When the model code (i.e. GF10 6a) is verified correctly and the result of Step S1062 is YES, the process proceeds to Step S1063. In Step S1063, the bit-unit data writing executor 131 determines whether the model-specific script file 6 instructs a writing operation of the maintenance data of the MFP 1, stored in the first memory 103 of the MFP 1, at the designated memory addresses.

When the instruction is determined as the writing operation and the result of Step S1063 is YES, the process proceeds to Step S1064 and the bit-unit data writing executor 131 determines whether the model-specific script file 6 instructs the bit-unit data writing operation. When the instruction is determined as the bit-unit data writing operation and the result of Step S1064 is YES, the process proceeds to Step S1065 and the bit-unit data writing executor 131 executes the operation. Then, in Step S1066, the result return manager 105 analyzes the performance of the reading or writing operation and returns the result of the analysis to the PC 3. The process is then ended.

When the instruction is determined as not being the bit-unit data writing operation in Step S1064 and the result of Step S1064 is NO, the process proceeds to Step S1067 and the byte-unit data writing executor 112 executes the operation. Then, in Step S1066, the result return manager 105 analyzes the performance of the reading or writing operation and returns the result of the analysis to the PC 3. The process is then ended.

When the instruction is determined as the reading operation and the result of Step S1063 is NO, the process proceeds to Step S1068 and the first maintenance execution controller 107 instructs the maintenance executor 104 to perform the reading operation. In Step S1066, the result return manager 105 analyzes the performance of the reading or writing operation and returns the result of the analysis to the PC 3. The process is then ended.

When the model code (i.e. GF10 6a) is not verified correctly and the result of Step S1062 is NO, the process proceeds to Step S1069. Then, in Step S1069, the first maintenance execution controller 107 instructs the maintenance executor 104 to reject the instruction of the model-specific script file 6. Then, in Step S1070, the first maintenance execution controller 107 sends an error signal to the PC 3. The process is then ended.

In this way as described above, the remote maintenance system 2000 of FIG. 10 can perform remote maintenance in which data can be written efficiently in a bit unit.

Next, the fifth embodiment of the remote maintenance system 2000 is explained with reference to FIG. 12, in which parts similar to those previously described with reference to FIG. 2 are denoted by the same reference numerals. The structure of the fifth embodiment of the remote maintenance system 2000 shown in FIG. 12 is similar to that of the first embodiment shown in FIG. 2, except for the following parts.

As described above, there are source script file instructions for instructing reading or writing data in a bit unit at a designated bit of a memory and these instructions perform efficiently in a case in which only one or a few bits in relatively large amounts of data are needed to be read or written, in comparison with a byte-unit-based operation. The fifth embodiment can determine whether the received instruction instructs a bit-unit data writing operation, and performs the operation at the PC 3 side.

Figure 12:
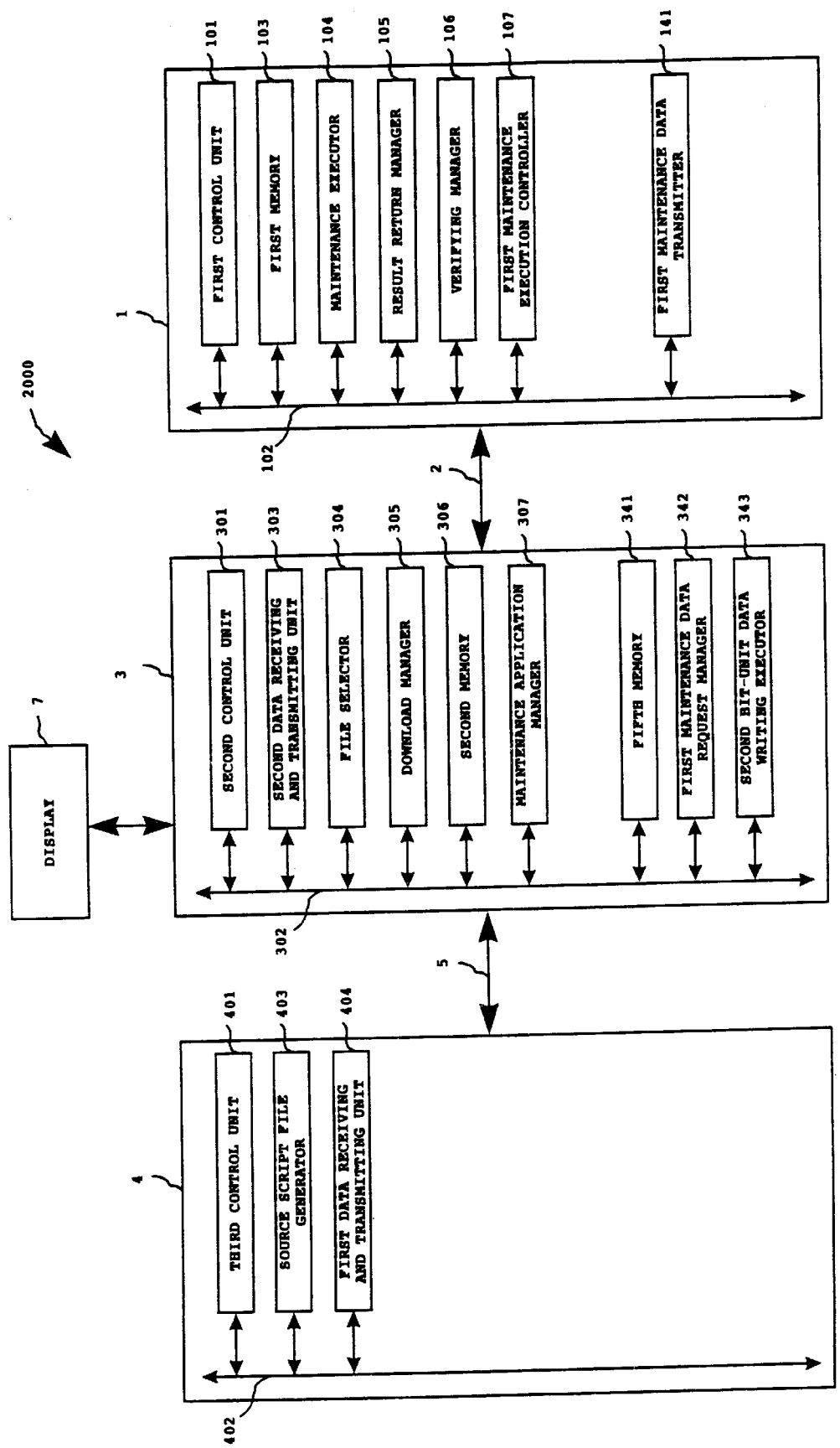
FIG. 12 is a block diagram of a fifth embodiment based on the first embodiment of the remote maintenance system shown in FIG. 1.

As shown in FIG. 12, the MFP 1 further includes a first maintenance data transmitter 141 for transmitting present state data of the maintenance data of the MFP 1 to the PC 3 side upon receiving a previous state requesting command from the PC 3.

The PC 3 further includes a fifth memory 341 for storing the transmitted present state data which is then regarded as the previous state data of the MFP 1. The PC 3 further includes a first maintenance data request manager 342 for determining whether the instruction of the model-specific script file 6 instructs the bit-unit data writing operation, for generating a previous state requesting command, and for transmitting the command to the MFP 1. The PC 3 further includes a bit-unit data writing executor 343 for executing the bit-unit data writing operation and for changing the model-specific script file 6 so that the instruction to be transmitted to the MFP 1 is a simple byte-unit writing operation.

By arranging the structure as described above, the remote maintenance system 2000 of FIG. 12 can perform remote maintenance in which data can be written efficiently in a bit unit at the PC 3 side before transmitting the model-specific script file to the MFP 1.

Next, the bit-unit writing operation performed by the fifth embodiment of the remote maintenance system 2000 of FIG. 12 is explained with reference to FIG. 13. A rough flow of the entire operation of the remote maintenance performed by the fifth embodiment of the remote maintenance system 2000 is similar to that of the first embodiment shown in FIG. 5(a), except for Step S1006. The following is a detail flow of the operational steps of FIG. 13 which replaces Step S1006 of FIG. 5(a).

Figure 13:
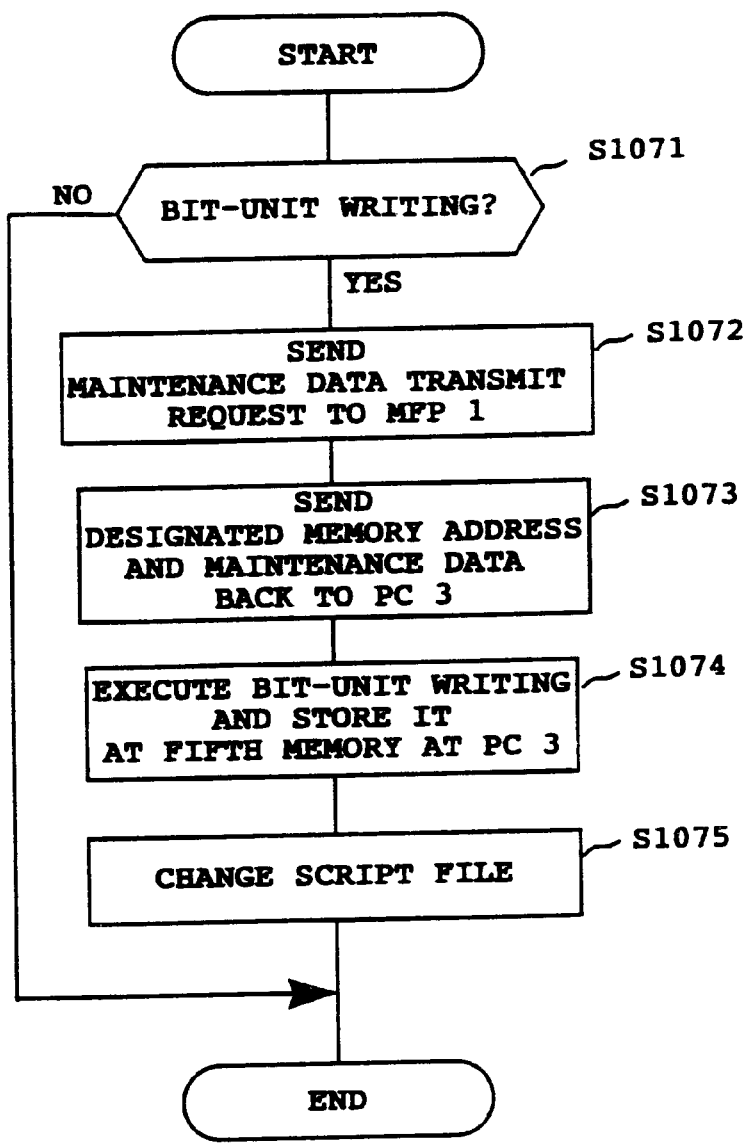
FIG. 13 is a flowchart for explaining a part of the operation of the fifth embodiment of the remote maintenance system shown in FIG. 12.

In Step S1071 of FIG. 13, the first maintenance data request manager 342 determines whether the instruction of the model-specific script file 6 instructs the bit-unit writing operation. When the instruction is determined as the bit-unit writing operation and the result of Step S1071 is YES, the process proceeds to Step S1072 and the first maintenance data request manager 342 transmits a previous state requesting command to the MFP 1, requesting to send data of the maintenance data at the designated memory addresses. Then, in Step S1073, the first maintenance data transmitter 141 transmits the data of the maintenance data at the designated memory addresses of the first memory 103 of the MFP 1 to the PC 3.

Then, in Step S1074, the bit-unit data writing manager 343 executes an operation of writing data of the maintenance data, transmitted from the MFP 1, on the bit-by-bit basis into fifth memory 341. After completing the bit-unit data writing operation, the bit-unit data writing manager 343, in Step S1075, modifies the model-specific script file 6 so that the instruction to be transmitted to the MFP 1 is a simple byte-unit writing operation.

When the instruction is determined as not being the bit-unit writing operation and the result of Step S1071 is NO, the process is ended.

In this way as described above, the remote maintenance system 2000 of FIG. 12 can perform remote maintenance in which data can be written efficiently in a bit unit.

Next, the sixth embodiment of the remote maintenance system 2000 is explained with reference to FIG. 14, in which parts similar to those previously described with reference to FIG. 2 are denoted by the same reference numerals. The structure of the sixth embodiment of the remote maintenance system 2000 shown in FIG. 14 is similar to that of the first embodiment shown in FIG. 2, except for the following parts.

The MFP 1 further includes a second maintenance data transmitter 151 for transmitting the maintenance data of the MFP 1 to the PC 3. The PC 3 further includes a second data reformatting manager 351 for reformatting the maintenance data transmitted from the MFP 1 into a predetermined file form, and a sixth memory 352 for storing the reformatted maintenance data.

Figure 14:
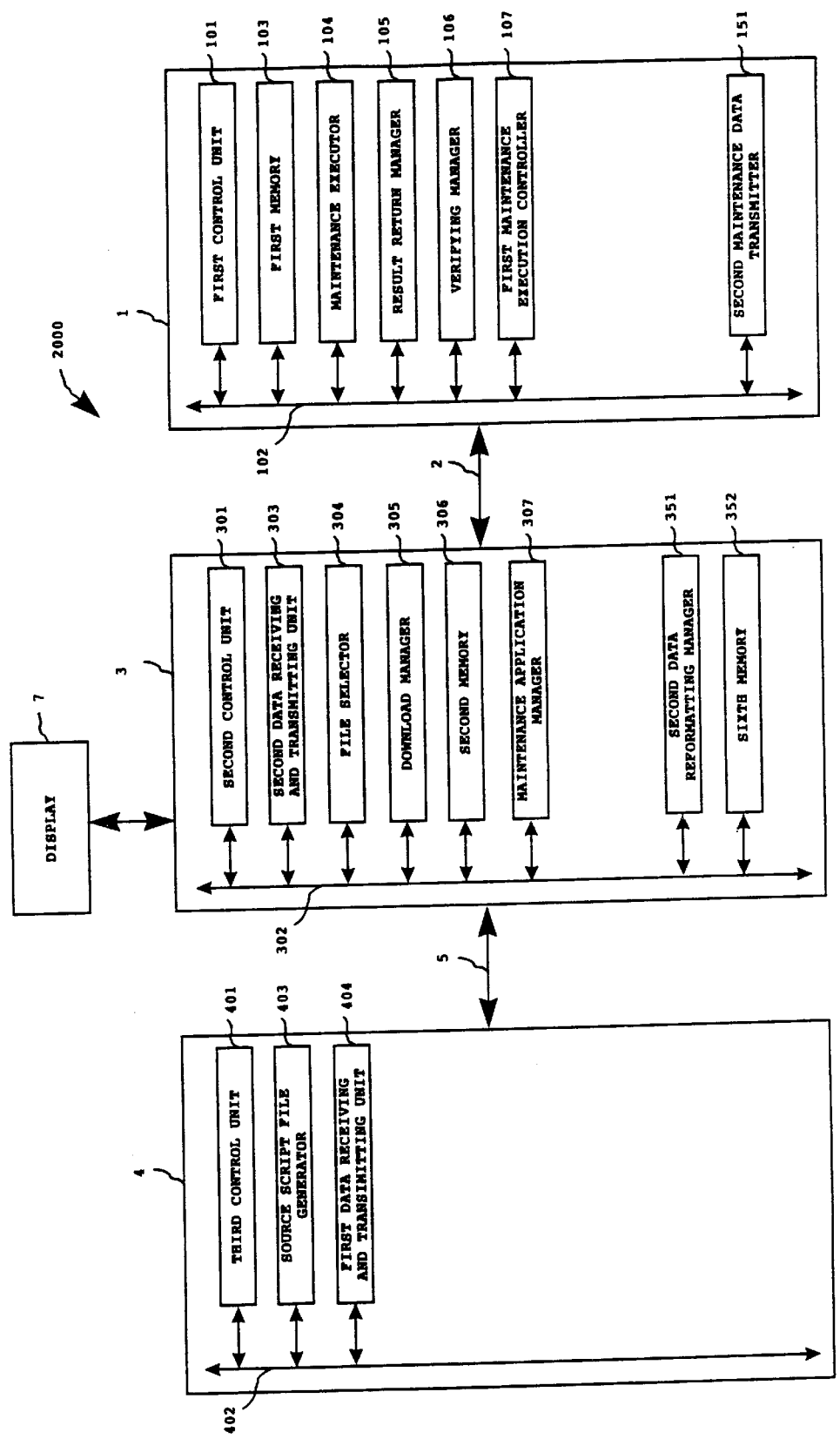
FIG. 14 is a block diagram of a sixth embodiment based on the first embodiment of the remote maintenance system shown in FIG. 1.

By this arrangement of the structure, the remote maintenance system 2000 of FIG. 14 can perform remote maintenance in which maintenance data of the MFP 1 can be transmitted to the PC 3 side at an arbitrary time.

Next, an operation of reading the maintenance data of the MFP 1 at the PC 3 side by the sixth embodiment of the remote maintenance system 2000 of FIG. 14 is explained with reference to FIG. 15. A rough flow of the entire operation the remote maintenance performed by the sixth embodiment of the remote maintenance system 2000 is similar to that of the first embodiment shown in FIG. 5(a), except for Step S1007. The following is a detail flow of the operational steps of FIG. 15 which substitutes Step S1007 of FIG. 5(a).

Figure 15:
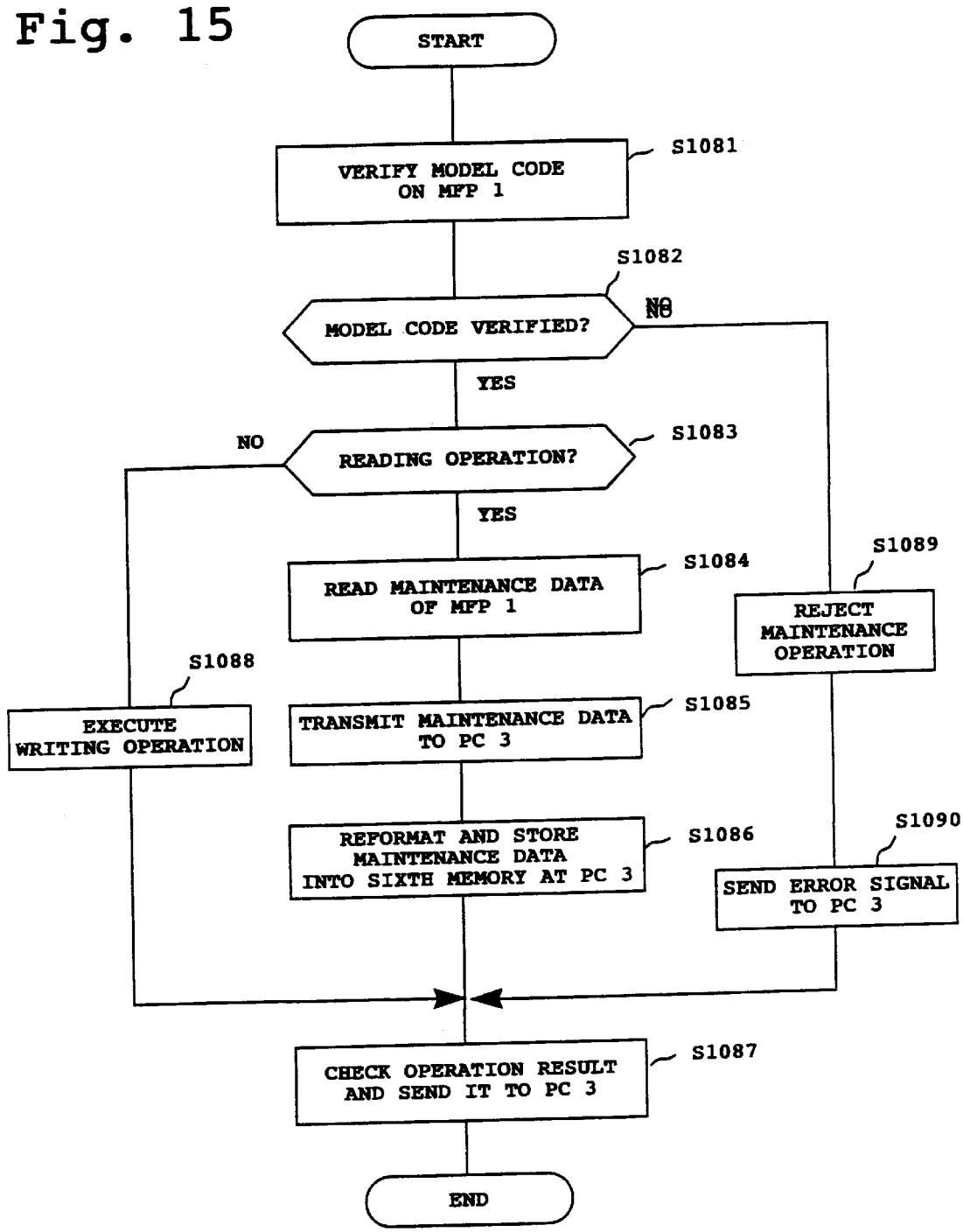
FIG. 15 is a flowchart for explaining a part of the operation of the sixth embodiment of the remote maintenance system shown in FIG. 14.

In Step S1081 of FIG. 15, the verifying manager 106 verifies the model code (i.e. GF10 6a) included in the model-specific script file 6 against the model identification code included in the maintenance data stored in the first memory 103 of the MFP 1. Then, in Step S1082, the first maintenance execution controller 107 determines whether the model code (i.e. GF10 6a) is verified correctly by the verifying manager 106.

When the model code (i.e. GF10 6a) is verified correctly and the result of Step S1082 is YES, the process proceeds to Step S1083. In Step S1083, the second maintenance data transmitter 151 determines whether the model-specific script file 6 instructs an operation of reading data of the first memory 103 of the MFP 1 at memory addresses designated thereby so as to read the maintenance data of the MFP 1.

When the instruction is determined as the reading operation and the result of Step S1083 is YES, the process proceeds to Step S1084 and the second maintenance data transmitter 151 activates the maintenance executor 104 to execute the reading operation. After a completion of the reading operation by the maintenance executor 104 in Step S1084, the second maintenance data transmitter 151 transmits the read data to the PC 3 side in Step S1085. Then, in Step S1086, the second data reformatting manager 351 reformats the received maintenance data into the predetermined data form, which is then referred to as a maintenance data file, and stores the maintenance data file into the sixth memory 352. Then, in Step S1087, the result return manager 105 analyzes the performance of the reading or writing operation and returns the result of the analysis to the PC 3. The process is then ended.

When the instruction is determined as not being the reading operation in Step S1083 and the result of Step S1083 is NO, the process proceeds to Step S1088 and the second maintenance data transmitter 151 activates the maintenance executor 104 to executes the writing operation. Then, the process proceeds to Step S1087 in which the result return manager 105 analyzes the performance of the reading or writing operation and returns the result of the analysis to the PC 3. The process is then ended.

When the model code (i.e. GF10 6a) is not verified correctly and the result of Step S1082 is NO, the process proceeds to Step S1089. In Step S1089, the second maintenance data transmitter 151 instructs the maintenance executor 104 to reject the instruction of the model-specific script file 6. Then, in Step S1090, the second maintenance data transmitter 151 sends an error signal to the PC 3. The process is then ended.

In this way as described above, the remote maintenance system 2000 of FIG. 14 can perform remote maintenance in which the maintenance data of the MFP 1 can be transmitted to the PC 3 side at an arbitrary time.

Figure 16:
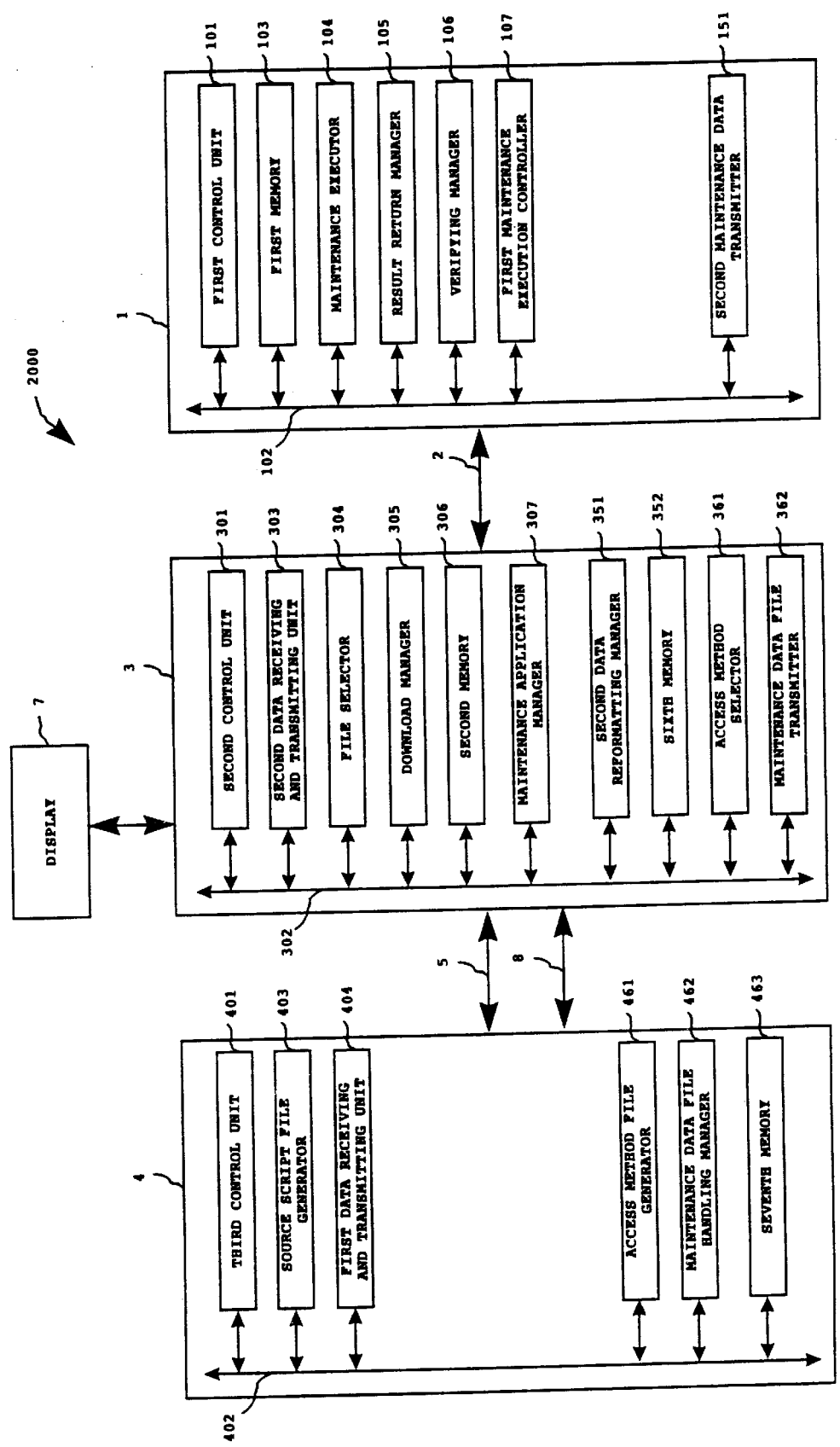
FIG. 16 is a block diagram of a seventh embodiment based on the sixth embodiment of the remote maintenance system shown in FIG. 14.

Next, the seventh embodiment of the remote maintenance system 2000 is explained with reference to FIG. 16. The structure of the seventh embodiment of the remote maintenance system 2000 of FIG. 16 is similar to that of the sixth embodiment shown in FIG. 14, except for parts mentioned below. And the parts, which are shown in FIG. 16 and similar to those previously described with reference to FIG. 14, are denoted by the same reference numerals and their repetitive descriptions are omitted.

In FIG. 16, the PC 3 further includes an access method selector 361 for automatically selecting an access method, suitable for the PC 3 in accordance with predetermined priorities given to each one of the access methods 8 and to the configuration of the PC 3, and for preparing a file transmitting condition in accordance with the selected access method. The PC 3 further includes a maintenance data file transmitter 362 for transmitting the maintenance data file stored in the sixth memory in the PC 3 to the PC 4 located at the remote maintenance service depot.

The PC 4 of FIG. 16 further includes an access method file generator 461 for generating an access method file that includes a plurality of access methods 8 for transmitting the maintenance data file from the PC 3 to the PC 4. The access methods 8 may include, for example, Internet, an electronic-mail system for a PC network, a public telephone line, and so forth. A floppy disk can also be one of the possible alternatives for the access method 8. The access methods 8 can be combined with the link method 5. In this embodiment, the Internet is used as an access method, for example. Accordingly, the access method selector 361 of the PC 3 prepares the file transmitting condition in such a way that the maintenance data can be transmitted automatically when the maintenance data file is stored into the sixth memory 352. To prepare the file transmitting condition, the access method selector 361 automatically adds necessary information such as a country code, regional code, and so forth, for example, to a telephone number given by the selected access method for an Internet operation.

The PC 4 further includes a maintenance data file handling manager 462 for performing a storing operation of the maintenance data file transmitted from the PC 3 and a seventh memory 463 for storing the maintenance data file.

By the-thus arranged structure, the remote maintenance system 2000 of FIG. 16 can perform remote maintenance in which the maintenance data file of the MFP 1 can be transmitted to and stored at the PC 4 side at an arbitrary time.

Next, an operation of transmitting the maintenance data file of the MFP 1 to the PC 4 side by the seventh embodiment of the remote maintenance system 2000 of FIG. 16 is explained with reference to FIGS. 17 and 18. A rough flow of the entire operation the remote maintenance performed by the seventh embodiment of the remote maintenance system 2000 is similar to that of the sixth embodiment shown in FIGS. 5(a) and 15, except for one additional procedure and Step S1008 of FIG. 5(a). The following are detail flows of the operational steps of the additional procedure represented by FIG. 17 and FIG. 18 which substitutes Step S1008 of FIG. 5(a).

Figure 17:
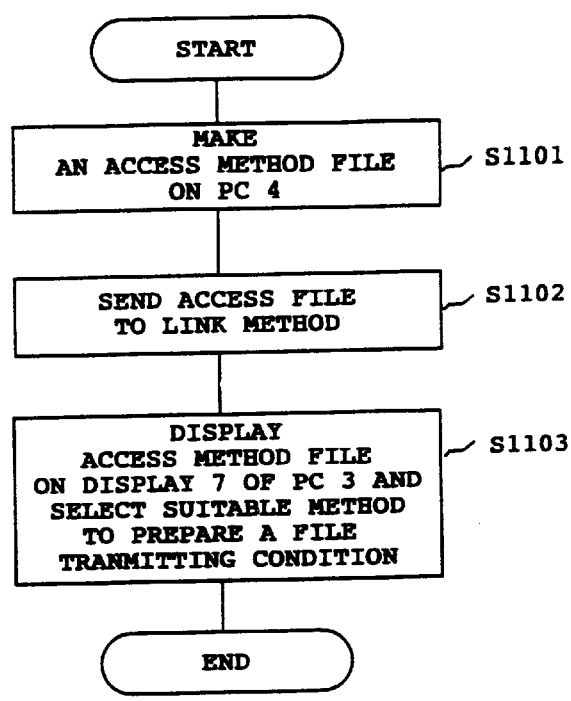
FIGS. 17 and 18 are flowcharts each for explaining a part of the operation of the seventh embodiment of the remote maintenance system shown in FIG. 16.

FIG. 17 shows a way in which the access method file is transmitted to the PC3 side using the Internet. In Step S1101 of FIG. 17, the access method file generator 461 of the PC 4 generates an access method file at an arbitrary time. Then, in Step S1102, the access method file generator 461 arranges to transmit the access method file to the home page of the service depot site linked to the Internet. Then, in Step S1103, when the home page of the service depot site is accessed by the user with the PC 3, the access method selector 361 of the PC 3 arranges to display the access method file on the display 7 of the PC 3. At the same time, in Step S1103, the access method selector 361 automatically selects an access method suitable for the PC 3 in accordance with predetermined priorities given to each one of the access methods 8 and to the configuration of the PC 3, and also prepares the file transmitting condition in accordance with the selected access method. Then, the process is ended.

Figure 18:
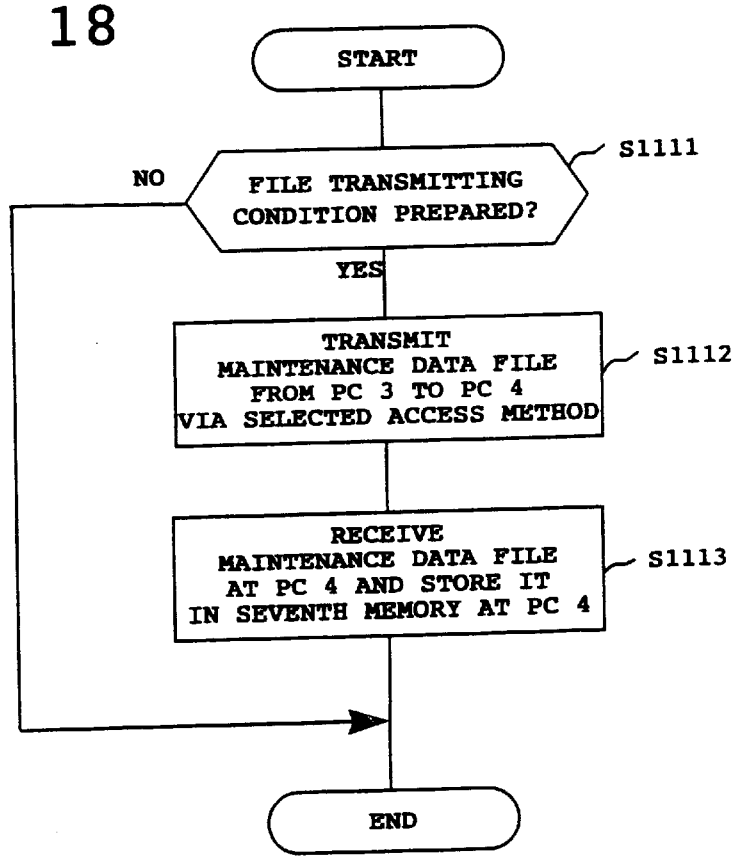

In Step S1111 of FIG. 18, the maintenance data file transmitter 362 determines whether the access method selector 361 has prepared the file transmitting condition when the maintenance data file is stored into the sixth memory 352 by the second data reformatting manager 351. When the file transmitting condition is prepared and the result of Step S1111 is YES, the process proceeds to Step S1112 and the maintenance data file transmitter 362 transmits the maintenance data file stored in the sixth memory 352 to the PC 4 side using the selected access method. Then, in Step S1112, the maintenance data file is transmitted to the PC 4 via the first data receiving and transmitting unit 404 and then the maintenance data file handling manager 462 arranges to store the maintenance data file into the seventh memory 463 at the PC 4.

In this way as described above, the remote maintenance system 2000 of FIG. 16 can perform remote maintenance in which the maintenance data of the MFP 1 can be transmitted to the PC 4 side via the PC 3.

Figure 19:
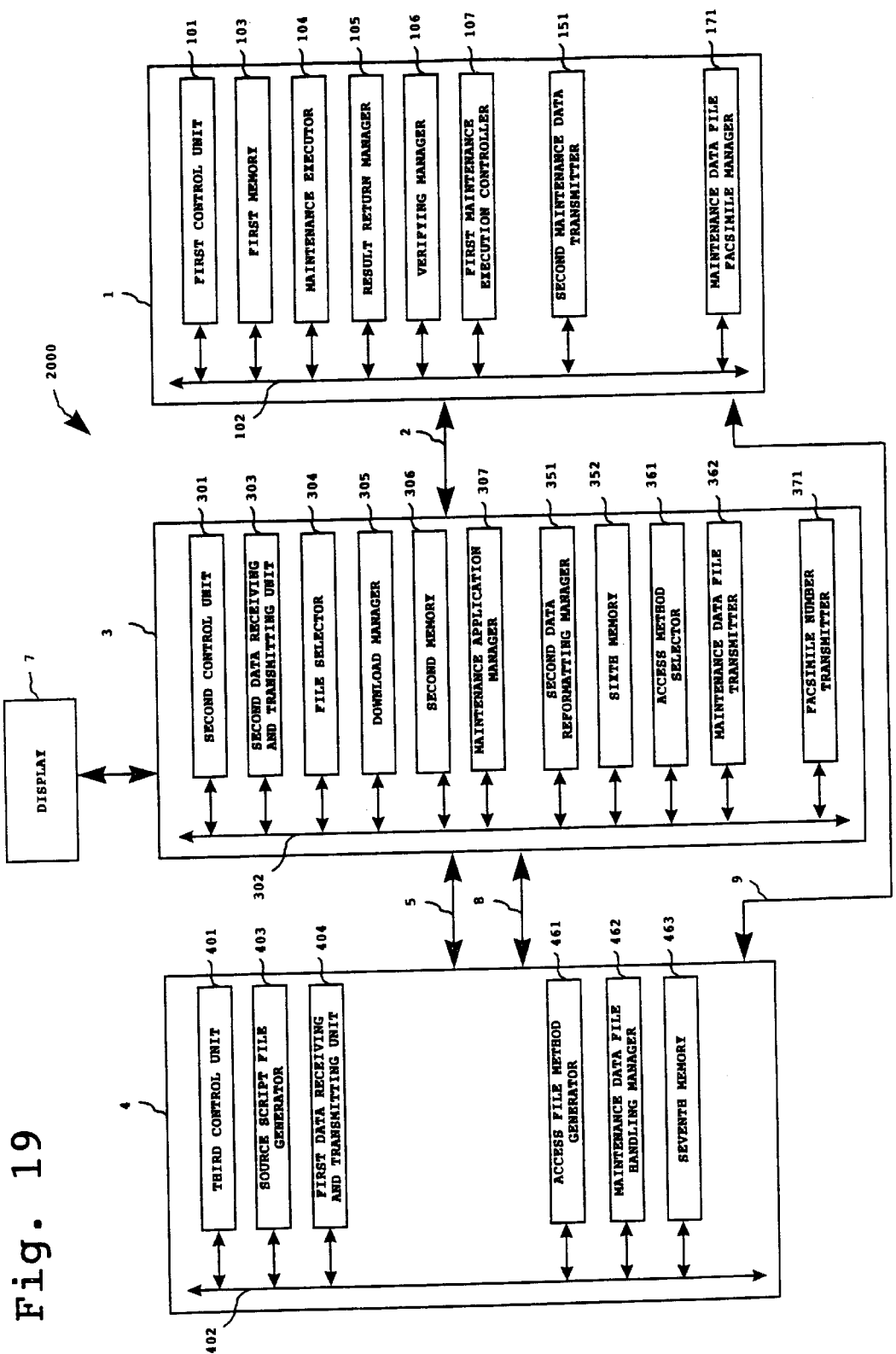
FIG. 19 is a block diagram of an eighth embodiment based on the seventh embodiment of the remote maintenance system shown in FIG. 16.

Next, the eighth embodiment of the remote maintenance system 2000 is explained with reference to FIG. 19. The structure of the eighth embodiment of the remote maintenance system 2000 of FIG. 19 is similar to that of the seventh embodiment shown in FIG. 16, except for a part mentioned below. And the parts, shown in FIG. 19 similar to those previously described with reference to FIG. 16, are denoted by the same reference numerals and their repetitive descriptions are omitted. In this embodiment, the access method file includes a facsimile number of the service depot site and the access method selector 361 stores the facsimile number when the access method file is transmitted to the PC 3.

The PC 3 of FIG. 19 further includes a facsimile number transmitter 371 for determining whether the access method selected by the access method selector 361 is busy and can not be used for transmitting the maintenance data file. The facsimile number transmitter 371 transmits the facsimile number of the service depot stored by the access method selector 361 together with the maintenance data file stored in the sixth memory 352 to the MFP 1 side when the selected access method is determined as busy. When the selected access method is determined as not busy, the facsimile number transmitter 371 initiates the maintenance data file transmitter 371 to execute the maintenance data file transmission to the PC 4 using the selected access method.

As an alternative, it may be possible to set the facsimile number transmitter 371 to a mode in which the facsimile number transmitter 371 always executes the transmitting operation of the facsimile number to the MFP 1 upon receiving the maintenance data file from the MFP 1 regardless of whether or not the selected access method is busy.

The MFP 1 of FIG. 19 further includes a maintenance data file facsimile manager 171, including a facsimile and data modem (modulator-demodulator) connected to a public telephone line 9, for transmitting the maintenance data file to the PC 4 in a facsimile image form over the public telephone line 9, upon receiving the facsimile number and the maintenance data file sent from the facsimile number transmitter 371 of the PC 4.

By the-thus arranged structure, the remote maintenance system 2000 of FIG. 19 can perform remote maintenance in which the maintenance data file of the MFP 1 can be transmitted to and stored at the PC 4 side using a facsimile transmission method directly from the MFP 1.

Next, an operation of transmitting the maintenance data file of the MFP 1 to the PC 4 side using a facsimile transmission method directly from the MFP 1 by the eighth embodiment of the remote maintenance system 2000 of FIG. 19 is explained with reference to FIGS. 20 and 21. A rough flow of the entire operation of the remote maintenance performed by the eighth embodiment of the remote maintenance system 2000 is similar to that of the seventh embodiment shown in FIGS. 5(a), 17 and 18, except for some parts of the procedures of FIG. 17 and FIG. 18. For the eighth embodiment, FIGS. 17 and 18 are substituted by FIG. 20 and 21, respectively, the detail of which are described below.

Figure 20:
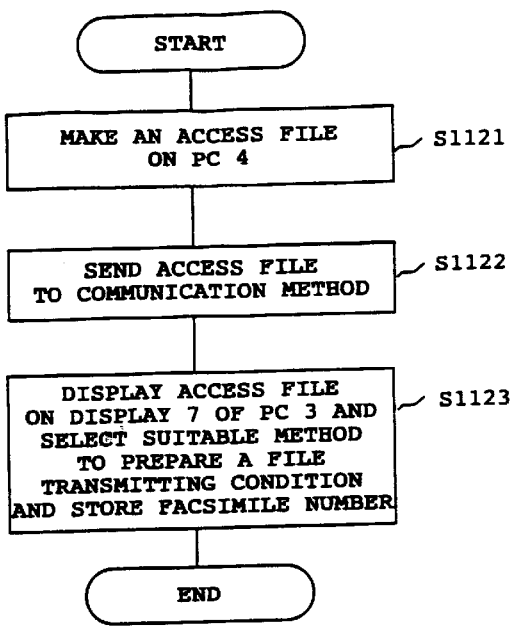
FIGS. 20 and 21 are flowcharts each for explaining a part of the operation of the eighth embodiment of the remote maintenance system shown in FIG. 19.

FIG. 20 shows a way in which the access method file, which includes a facsimile number of the remote maintenance service depot, is transmitted to the PC 3 side using the Internet. In Step S1121 of FIG. 20, the access method file generator 461 of the PC 4 generates an access method file at an arbitrary time. Then, in Step S1122, the access method file generator 461 arranges to transmit the access method file to the home page of the service depot site linked to the Internet. Then, in Step S1123, when the home page of the service depot site is accessed by the user with the PC.3, the access method selector 361 of the PC 3 arranges to display the access method file on the display 7 of the PC 3. At the same time, in Step S1123, the access method selector 361 automatically selects and stores an access method suitable for the PC 3 in accordance with predetermined priorities given to a cross reference between the configuration of the PC 3 and the access methods. Also, in Step S1123, the access method selector 361 automatically searches for the facsimile number for the service depot site included in the access method file and saves it. Then, the process is ended.

Figure 21:
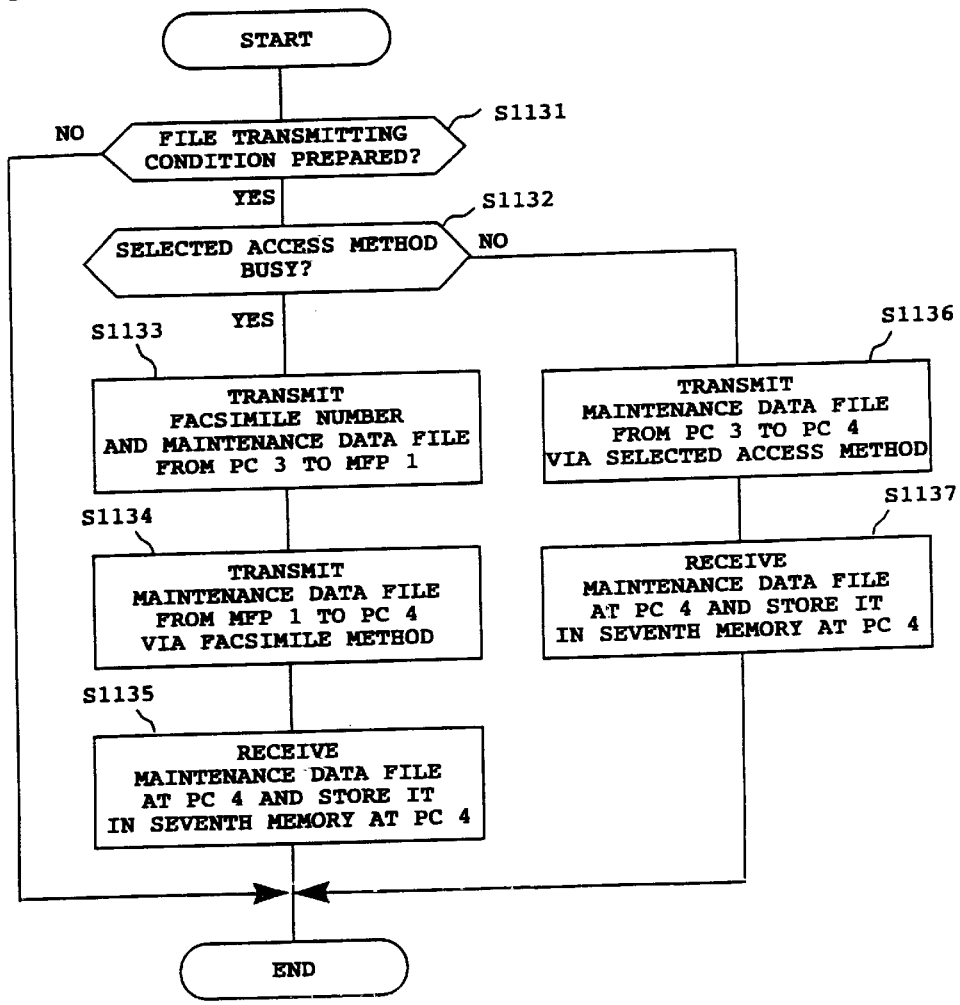

In Step S1131 of FIG. 21, the maintenance data file transmitter 362 determines whether the access method selector 361 has selected an access method and prepared the file transmitting condition in accordance with the selected access method when the maintenance data file is stored into the sixth memory 352 by the second data reformatting manager 351. When an access method is not selected and the file transmitting condition has not been prepared by the access method selector 361, the process is ended.

When an access method is selected and the file transmitting condition has been prepared and the result of Step S1131 is YES, the process proceeds to Step S1132 and the facsimile number transmitter 371 determines whether the selected access method is busy and the maintenance data file can not be transmitted using the selected access method. When the selected access method is busy and the result of Step S1132 is YES, the process proceeds to Step S1133 and the facsimile number transmitter 371 transmits the facsimile number of the remote maintenance service depot site and the maintenance data file to the MFP 1 side. Then, in Step S1134, the maintenance data file facsimile manager 171 transmits the maintenance data file, received from the PC 3, to the PC 4 side over the public telephone line 9 using the facsimile and data modem of the MFP 1. Then, in Step S1135, the maintenance data file is transmitted to the PC 4 via the first data receiving and transmitting unit 404 and then the maintenance data file handling manager 462 arranges to store the maintenance data file into the seventh memory 463 at the PC 4. Then, the process is ended.

When the selected access method is not busy and the result of Step S1132 is NO, the process proceeds to Step S1136. In Step S1136, the facsimile number transmitter 371 initiates the maintenance data file transmitter 362, and the maintenance data file transmitter 362 transmits the maintenance data file stored in the sixth memory 352 to the PC 4 side using the selected access method. Then, in Step S1137, the maintenance data file is transmitted to the PC 4 via the first data receiving and transmitting unit 404 and then the maintenance data file handling manager 462 arranges to store the maintenance data file into the seventh memory 463 at the PC 4.

In this way as described above, the remote maintenance system 2000 of FIG. 19 can perform remote maintenance in which the maintenance data of the MFP 1 can be transmitted to the PC 4 side from the MFP 1 using the facsimile transmission function of the MFP 1.

This invention may be conveniently implemented using a conventional general purpose digital computer programmed according to the teachings of the present specification, as will be apparent to those skilled in the computer arts. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A remote maintenance system for computer peripherals, comprising:

at least one computer;

at least one computer peripheral coupled to said at least one computer and including a first memory for storing maintenance data including identification information for identifying said at least one computer peripheral and programmed parameters for adjusting an operating condition of said at least one computer peripheral, the at least one computer communicating information from a remote maintenance provider's site to the at least one peripheral;

source script file generating means provided at the remote maintenance provider's site for generating a source script file including instructions for instructing at least one of operations of reading and writing said maintenance data stored in said first memory of said at least one computer peripheral and for providing the source script file to the at least one computer; and first data receiving and transmitting means provided at the remote maintenance provider's site for receiving information from a link method for connecting between said data receiving and transmitting means and said at least one computer and for transmitting said source script file created by said source script file generating means to said link method;

wherein said at least one computer includes:

second data receiving and transmitting means for receiving said source script file sent from said first data receiving and transmitting means via said link method and for transmitting data to said link method and to said at least one computer peripheral;

selecting means for selecting an instruction for a model of said at least one computer peripheral connected to said at least one computer from among said instructions included in said source script file and for generating a model-specific script file including said selected instruction;

a second memory for storing said model-specific script file;

downloading means for downloading said model-specific script file including said selected instruction into said second memory; and maintenance application execution means for executing at an arbitrary time a maintenance application for transmitting said downloaded model-specific script file to said at least one computer peripheral after said model-specific script file is downloaded into said second memory;

and wherein said at least one computer peripheral further comprises:

maintenance executing means for executing at least one of reading and writing said maintenance data stored in said first memory of said at least one computer peripheral in accordance with said selected instruction included in said model-specific script file; and result feedback means for determining whether said maintenance executing means has properly executed said operations of reading and writing said maintenance data in accordance with said selected instruction and for transmitting a result of said determination to said at least one computer.

2. The remote maintenance system for peripherals according to claim 1, wherein each one of said instructions included in said source and model-specific script files includes model specification information for specifying a model of said at least one computer peripheral to which said instructions are applicable, said identification information stored in said first memory includes model identification information, and said at least one computer peripheral further comprises:

verifying means for verifying said model specification information against said model identification information included in said identification information stored in said first memory of said at least one computer peripheral before said maintenance executing means starts said execution of at least one of said operations of reading and writing said maintenance data;

first maintenance execution control means for controlling said maintenance executing means to continue said execution of at least one of said operations of reading and writing said maintenance data when said model specification information included in said instruction of said model-specific script file is verified against said model identification information included in said identification information stored in said first memory of said at least one computer peripheral by said verifying means and to stop said execution of at least one of said operations of reading and writing said maintenance data when said model specification information included in said instruction of said model-specific script file is failed to be verified against said model identification information included in said identification information stored in said first memory of said at least one computer peripheral by said verifying means.

3. The remote maintenance system for computer peripherals according to claim 2, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit data writing operations, and said at least one computer peripheral further comprises:

first bit-unit data writing means for examining data of said maintenance data at said target bit of said memory addresses in said first memory, and for writing said data of said maintenance data at said target bit of said memory addresses in said first memory using said replacement data only when data of said maintenance data at said target bit of said memory addresses in said first memory differs from said replacement data.

4. The remote maintenance system for computer peripherals according to claim 3, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:

second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;

and wherein said at least one computer further includes:
a sixth memory for storing data in said predetermined file form;
second data reformatting means for receiving said maintenance data transmitted by said second maintenance data transmitting means, for reformatting said received maintenance data into said predetermined file form, and for transmitting said reformatted maintenance data into said sixth memory.

5. The remote maintenance system for computer peripherals according to claim 4, further comprising:

access method file generating means provided at said remote maintenance provider's site for generating an access method file including a plurality of access methods, to be used selectively, and for transmitting said access method file to said link method using said first receiving and transmitting means;

and wherein said at least one computer further includes:
access method selecting means for selecting an access method among from said plurality of said access methods included in said access method file list received via said link method and for preparing a file transmitting condition in accordance with said selected access method; and
maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

6. The remote maintenance system for computer peripherals according to claim 5, wherein said access method selecting means automatically search and store a facsimile number of a facsimile apparatus of said remote maintenance provider's site, included in said access method file, upon receiving said access method file, said at least one computer further includes:

facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;

and wherein said at least one computer peripheral further includes:
a facsimile modem;
maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

7. The remote maintenance system for computer peripherals according to claim 6, wherein said at least one computer is a standard personal computer including a standard operating system therein and said at least one computer peripheral is a multi-function peripheral apparatus selectively including at least one of functions of scanning, printing, a facsimile, and copying.

8. The remote maintenance system for computer peripherals according to claim 5, wherein said at least one computer is a standard personal computer including a standard operating system therein and said at least one computer peripheral is a multi-function peripheral apparatus selectively including at least one of functions of scanning, printing, a facsimile, and copying.

9. The remote maintenance system for computer peripherals according to claim 4, wherein said at least one computer is a standard personal computer including a standard operating system therein and said at least one computer peripheral is a multi-function peripheral apparatus selectively including at least one of functions of scanning, printing, a facsimile, and copying.

10. The remote maintenance system for computer peripherals according to claim 3, wherein said at least one computer is a standard personal computer including a standard operating system therein and said at least one computer peripheral is a multi-function peripheral apparatus selectively including at least one of functions of scanning, printing, a facsimile, and copying.

11. The remote maintenance system for computer peripherals according to claim 2, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit data writing operations, and said at least one computer further includes:

a fifth memory; and first maintenance data request means for determining whether said selected instruction instructs an operation of writing said maintenance data using said replacement data, said memory addresses, and said target bit in said memory addresses, for requesting said at least one computer peripheral to transmit said maintenance data stored in said first memory of said at least one computer peripheral at said location specified by said memory addresses to said fifth memory of said computer when said instruction is determined as to execute said operation of writing said maintenance data using said replacement data, said memory addresses, and said target bit in said memory addresses;

said at least one computer peripheral further includes:

first maintenance data transmitting means for transmitting said maintenance data stored in said first memory of said at least one computer peripheral at said location specified by said memory addresses to said fifth memory of said computer;

said at least one computer further includes:

second bit-unit data writing means for examining data of said maintenance data stored in said fifth memory of said at least one computer at said location specified by said target bit and said memory addresses, for writing said data of said maintenance data at said target bit of said memory addresses using said replacement data according to said selected instruction only when data of said maintenance data at said target bit of said memory addresses in said fifth memory differs from said replacement data, and for transmitting said written maintenance data back to said at least one computer peripheral so that said maintenance execution means executes a writing operation of said written maintenance data.

12. The remote maintenance system for computer peripherals according to claim 11, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:

second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;

and wherein said at least one computer further includes:

a sixth memory for storing data in said predetermined file form;

second data reformatting means for receiving said maintenance data transmitted by said second maintenance data transmitting means, for reformatting said received maintenance data into said predetermined file form, and for transmitting said reformatted maintenance data into said sixth memory.

13. The remote maintenance system for computer peripherals according to claim 12, further comprising:

access method file generating means provided at said remote maintenance provider's site for generating an access method file including a plurality of access methods, to be used selectively, and for transmitting said access method file to said link method using said first receiving and transmitting means;

and wherein said at least one computer further includes:

access method selecting means for selecting an access method among from said plurality of said access methods included in said access method file list received via said link method and for preparing a file transmitting condition in accordance with said selected access method; and maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

14. The remote maintenance system for said at least one computer peripherals according to claim 13, wherein said access method selecting means automatically search and store a facsimile number of a facsimile apparatus of said remote maintenance provider's site, included in said access method file, upon receiving said access method file, said at least one computer further includes:

facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;

and wherein said at least one computer peripheral further includes:

a facsimile modem;

maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

15. The remote maintenance system for computer peripherals according to claim 14, wherein said at least one computer is a standard personal computer including a standard operating system therein and said at least one computer peripheral is a multi-function peripheral apparatus selectively including at least one of functions of scanning, printing, a facsimile, and copying.

16. The remote maintenance system for computer peripherals according to claim 13, wherein said at least one computer is a standard personal computer including a standard operating system therein and said computer peripheral is a multi-function peripheral apparatus selectively including at least one of functions of scanning, printing, a facsimile, and copying.

17. The remote maintenance system for computer peripherals according to claim 12, wherein said at least one computer is a standard personal computer including a standard operating system therein and said at least one computer peripheral is a multi-function peripheral apparatus selectively including at least one of functions of scanning, printing, a facsimile, and copying.

18. The remote maintenance system for computer peripherals according to claim 11, wherein said at least one computer is a standard personal computer including a standard operating system therein and said at least one computer peripheral is a multi-function peripheral apparatus selectively including at least one of functions of scanning, printing, a facsimile, and copying.

19. The remote maintenance system for computer peripherals according to claim 2, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:
second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;
and wherein said at least one computer further includes:
a sixth memory for storing data in said predetermined file form;
second data reformatting means for receiving said maintenance data transmitted by said second maintenance data transmitting means, for reformatting said received maintenance data into said predetermined file form, and for transmitting said reformatted maintenance data into said sixth memory.

20. The remote maintenance system for computer peripherals according to claim 19, further comprising:

access method file generating means provided at said remote maintenance provider's site for generating an access method file including a plurality of access methods, to be used selectively, and for transmitting said access method file to said link method using said first receiving and transmitting means;
and wherein said at least one computer further includes:
access method selecting means for selecting an access method among from said plurality of said access methods included in said access method file list received via said link method and for preparing a file transmitting condition in accordance with said selected access method; and
maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

21. The remote maintenance system for computer peripherals according to claim 20, wherein said access method selecting means automatically search and store a facsimile number of a facsimile apparatus of said remote maintenance provider's site, included in said access method file, upon receiving said access method file, said at least one computer further includes:
facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;
and wherein said at least one computer peripheral further includes:
a facsimile modem;
maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

22. The remote maintenance system for computer peripherals according to claim 21, wherein said at least one computer is a standard personal computer including a standard operating system therein and said at least one computer peripheral is a multi-function peripheral apparatus selectively including at least one of functions of scanning, printing, a facsimile, and copying.

23. The remote maintenance system for computer peripherals according to claim 20, wherein said at least one computer is a standard personal computer including a standard operating system therein and said at least one computer peripheral is a multi-function peripheral apparatus selectively including at least one of functions of scanning, printing, a facsimile, and copying.

24. The remote maintenance system for computer peripheral according to claim 19, wherein said at least one computer is a standard personal computer including a standard operating system therein and said at least one computer peripheral is a multi-function peripheral apparatus selectively including at least one of functions of scanning, printing, a facsimile, and copying.

25. The remote maintenance system for computer peripherals according to claim 2, wherein said at least one computer is a standard personal computer including a standard operating system therein and said at least one computer peripheral is a multi-function peripheral apparatus selectively including at least one of functions of scanning, printing, a facsimile, and copying.

26. The remote maintenance system for computer peripherals according to claim 1, wherein, when said selected instruction included in said model-specific script file instructs an operation of writing said maintenance data stored in said first memory of said at least one computer peripheral, said selected instruction includes replacement data for changing a portion of said maintenance and memory addresses for specifying a location of said maintenance data to be changed in said first memory, and said at least one computer further comprises:

first state restoring instruction means for sending at arbitrary time a state restoring command to said at least one computer peripheral after maintenance execution means executes at least one of said operations of reading and writing said maintenance data, said state restoring command restoring a state of said at least one computer peripheral to a previous state of said same;

and wherein said at least one computer peripheral further includes:

a third memory for storing information including said memory addresses, included in said instruction of said model-specific script file, and associated data;

second maintenance execution control means for determining whether said selected instruction instructs an operation of writing said maintenance data using said replacement data and said memory addresses, for storing said memory addresses and data representing a present state of said maintenance data, stored in said first memory at said location specified by said memory addresses, into said third memory when said selected instruction is determined as to execute a writing operation, said present state being regarded as a previous state after being stored into said third memory, and, then, for enabling said maintenance execution means to execute said operation of writing said maintenance data using said replacement data and said memory address;

first state restoring means for restoring a state of said maintenance data stored in said first memory to a previous state using said memory addresses and said previous state stored in said third memory when said at least one computer peripheral receives a state storing command sent from said first state storing instruction means of said at least one computer.

27. The remote maintenance system for computer peripherals according to claim 26, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit data writing operations, and said at least one computer peripheral further comprises:

first bit-unit data writing means for examining data of said maintenance data at said target bit of said memory addresses in said first memory, and for writing said data of said maintenance data at said target bit of said memory addresses in said first memory using said replacement data only when data of said maintenance data at said target bit of said memory addresses in said first memory differs from said replacement data.

28. The remote maintenance system for computer peripherals according to claim 27, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:

second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;

and wherein said at least one computer further includes:

a sixth memory for storing data in said predetermined file form;

second data reformatting means for receiving said maintenance data transmitted by said second maintenance data transmitting means, for reformatting said received maintenance data into said predetermined file form, and for transmitting said reformatted maintenance data into said sixth memory.

29. The remote maintenance system for said at least one computer peripherals according to claim 28, further comprising:

access method file generating means provided at said remote maintenance provider's site for generating an access method file including a plurality of access methods, to be used selectively, and for transmitting said access method file to said link method using said first receiving and transmitting means;

and wherein said at least one computer further includes:

access method selecting means for selecting an access method among from said plurality of said access methods included in said access method file list received via said link method and for preparing a file transmitting condition in accordance with said selected access method; and maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

30. The remote maintenance system for computer peripherals according to claim 29, wherein said access method selecting means automatically search and store a facsimile number of a facsimile apparatus of said remote maintenance provider's site, included in said access method file, upon receiving said access method file, said at least one computer further includes:

facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;

and wherein said at least one computer peripheral further includes:
    a facsimile modem;
    maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

31. The remote maintenance system for computer peripherals according to claim 30, wherein said at least one computer is a standard personal computer including a standard operating system therein and said at least one computer peripheral is a multi-function peripheral apparatus selectively including at least one of functions of scanning, printing, a facsimile, and copying.

32. The remote maintenance system for computer peripherals according to claim 29, wherein said at least one computer is a standard personal computer including a standard operating system therein and said at least one computer peripheral is a multi-function peripheral apparatus selectively including at least one of functions of scanning, printing, a facsimile, and copying.

33. The remote maintenance system for computer peripherals according to claim 28, wherein said at least one computer is a standard personal computer including a standard operating system therein and said at least one computer peripheral is a multi-function peripheral apparatus selectively including at least one of functions of scanning, printing, a facsimile, and copying.

34. The remote maintenance system for computer peripherals according to claim 27, wherein said at least one computer is a standard personal computer including a standard operating system therein and said at least one computer peripheral is a multi-function peripheral apparatus selectively including at least one of functions of scanning, printing, a facsimile, and copying.

35. The remote maintenance system for computer peripherals according to claim 26, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit data writing operations, and said at least one computer further includes:

a fifth memory; and first maintenance data request means for determining whether said selected instruction instructs an operation of writing said maintenance data using said replacement data, said memory addresses, and said target bit in said memory addresses, for requesting said at least one computer peripheral to transmit said maintenance data stored in said first memory of said at least one computer peripheral at said location specified by said memory addresses to said fifth memory of said at least one computer when said instruction is determined as to execute said operation of writing said maintenance data using said replacement data, said memory addresses, and said target bit in said memory addresses;

said at least one computer peripheral further includes:
    first maintenance data transmitting means for transmitting said maintenance data stored in said first memory of said at least one computer peripheral at said location specified by said memory addresses to said fifth memory of said at least one computer;

said at least one computer further includes:
    second bit-unit data writing means for examining data of said maintenance data stored in said fifth memory of said at least one computer at said location specified by said target bit and said memory addresses, for writing said data of said maintenance data at said target bit of said memory addresses using said replacement data according to said selected instruction only when data of said maintenance data at said target bit of said memory addresses in said fifth memory differs from said replacement data, and for transmitting said written maintenance data back to said at least one computer peripheral so that said maintenance execution means executes a writing operation of said written maintenance data.

36. The remote maintenance system for computer peripherals according to claim 35, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:

second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;

and wherein said computer further includes:
    a sixth memory for storing data in said predetermined file form;
    second data reformatting means for receiving said maintenance data transmitted by said second maintenance data transmitting means, for reformatting said received maintenance data into said predetermined file form, and for transmitting said reformatted maintenance data into said sixth memory.

37. The remote maintenance system for computer peripherals according to claim 36, further comprising:

access method file generating means provided at said remote maintenance provider's site for generating an access method file including a plurality of access methods, to be used selectively, and for transmitting said access method file to said link method using said first receiving and transmitting means;

and wherein said at least one computer further includes:

access method selecting means for selecting an access method among from said plurality of said access methods included in said access method file list received via said link method and for preparing a file transmitting condition in accordance with said selected access method; and maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

38. The remote maintenance system for computer peripherals according to claim 37, wherein said access method selecting means automatically search and store a facsimile number of a facsimile apparatus of said remote maintenance provider's site, included in said access method file, upon receiving said access method file, said at least one computer further includes:

facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;

and wherein said at least one computer peripheral further includes:

a facsimile modem;

maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

39. The remote maintenance system for computer peripherals according to claim 38, wherein said at least one computer is a standard personal computer including a standard operating system therein and said at least one computer peripheral is a multi-function peripheral apparatus selectively including at least one of functions of scanning, printing, a facsimile, and copying.

40. The remote maintenance system for computer peripherals according to claim 37, wherein said at least one computer is a standard personal computer including a standard operating system therein and said at least one computer peripheral is a multi-function peripheral apparatus selectively including at least one of functions of scanning, printing, a facsimile, and copying.

41. The remote maintenance system for computer peripherals according to claim 36, wherein said at least one computer is a standard personal computer including a standard operating system therein and said at least one computer peripheral is a multi-function peripheral apparatus selectively including at least one of functions of scanning, printing, a facsimile, and copying.

42. The remote maintenance system for computer peripherals according to claim 38, wherein said at least one computer is a standard personal computer including a standard operating system therein and said at least one computer peripheral is a multi-function peripheral apparatus selectively including at least one of functions of scanning, printing, a facsimile, and copying.

43. The remote maintenance system for computer peripherals according to claim 26, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:

second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;

and wherein said at least one computer further includes:

a sixth memory for storing data in said predetermined file form;

second data reformatting means for receiving said maintenance data transmitted by said second maintenance data transmitting means, for reformatting said received maintenance data into said predetermined file form, and for transmitting said reformatted maintenance data into said sixth memory.

44. The remote maintenance system for computer peripherals according to claim 43, further comprising:

access method file generating means provided at said remote maintenance provider's site for generating an access method file including a plurality of access methods, to be used selectively, and for transmitting said access method file to said link method using said first receiving and transmitting means;

and wherein said computer further includes:

access method selecting means for selecting an access method among from said plurality of said access methods included in said access method file list received via said link method and for preparing a file transmitting condition in accordance with said selected access method; and maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

45. The remote maintenance system for computer peripherals according to claim 44, wherein said access method selecting means automatically search and store a facsimile number of a facsimile apparatus of said remote maintenance provider's site, included in said access method file, upon receiving said access method file, said at least one computer further includes:

facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;

and wherein said at least one computer peripheral further includes:

a facsimile modem;

maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

46. The remote maintenance system for computer peripherals according to claim 45, wherein said at least one computer is a standard personal computer including a standard operating system therein and said at least one computer peripheral is a multi-function peripheral apparatus selectively including at least one of functions of scanning, printing, a facsimile, and copying.

47. The remote maintenance system for said at least one computer peripherals according to claim 44, wherein said at least one computer is a standard personal computer including a standard operating system therein and said at least one computer peripheral is a multi-function peripheral apparatus selectively including at least one of functions of scanning, printing, a facsimile, and copying.

48. The remote maintenance system for computer peripherals according to claim 43, wherein said at least one computer is a standard personal computer including a standard operating system therein and said at least one computer peripheral is a multi-function peripheral apparatus selectively including at least one of functions of scanning, printing, a facsimile, and copying.

49. The remote maintenance system for computer peripherals according to claim 26, wherein said at least one computer is a standard personal computer including a standard operating system therein and said at least one computer peripheral is a multi-function peripheral apparatus selectively including at least one of functions of scanning, printing, a facsimile, and copying.

50. The remote maintenance system for computer peripherals according to claim 1, wherein, when said selected instruction included in said model-specific script file instructs an operation of writing said maintenance data stored in said first memory of said at least one computer peripheral, said selected instruction includes replacement data for changing a portion of said maintenance data and memory addresses for specifying a location of said maintenance data to be changed in said first memory, said at least one computer peripheral further includes:

third maintenance execution control means for determining whether said selected instruction instructs an operation of writing said maintenance data using said replacement data and said memory addresses, and for transmitting said memory addresses and a present state of said maintenance data, stored in said first memory at a location specified by said memory addresses, to said at least one computer when said instruction is determined as to execute said operation of writing said maintenance data, said present state being regarded as a previous state when being transmitted to said at least one computer, and, then, for enabling said maintenance execution means to execute said operation of writing said maintenance data using said replacement data and said memory addresses;

wherein said at least one computer further comprises:

a fourth memory for storing data in a predetermined file form;

first data reformatting means for reformatting data representing said memory addresses and previous state, sent by said third maintenance execution control means, into said predetermined file form and for storing said reformatted data representing said memory addresses and present state into said fourth memory with making a linkage with said selected instruction included in said model-specific script file;

second state restoring instruction means for sending at arbitrary time a state restoring command to return to said previous state of said maintenance data at said memory addresses to said at least one computer peripheral after maintenance execution means executes at least one of said operations of reading and writing said maintenance data, said state restoring command restoring a state of said at least one computer peripheral to a previous state of said same stored in said fourth memory of said at least one computer;

and wherein said at least one computer peripheral further includes;

second state restoring means for restoring a state of said maintenance data stored in said first memory to a previous state using said memory addresses and said previous state stored in said predetermined file form in said fourth memory of said at least one computer when said at least one computer peripheral receives a state storing command sent from said first state storing instruction means of said at least one computer.

51. The remote maintenance system for computer peripherals according to claim 50, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit data writing operations, and said at least one computer peripheral further includes:

first bit-unit data writing means for examining data of said maintenance data at said target bit of said memory addresses in said first memory, and for writing said data of said maintenance data at said target bit of said memory addresses in said first memory using said replacement data only when data of said maintenance data at said target bit of said memory addresses in said first memory differs from said replacement data.

52. The remote maintenance system for computer peripherals according to claim 51, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:

second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;

and wherein said at least one computer further includes:
a sixth memory for storing data in said predetermined file form;
second data reformatting means for receiving said maintenance data transmitted by said second maintenance data transmitting means, for reformatting said received maintenance data into said predetermined file form, and for transmitting said reformatted maintenance data into said sixth memory.

53. The remote maintenance system for computer peripherals according to claim 52, further comprising:

access method file generating means provided at said remote maintenance provider's site for generating an access method file including a plurality of access methods, to be used selectively, and for transmitting said access method file to said link method using said first receiving and transmitting means;

and wherein said at least one computer further includes:
access method selecting means for selecting an access method among from said plurality of said access methods included in said access method file list received via said link method and for preparing a file transmitting condition in accordance with said selected access method; and
maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

54. The remote maintenance system for computer peripherals according to claim 53, wherein said access method selecting means automatically search and store a facsimile number of a facsimile apparatus of said remote maintenance provider's site, included in said access method file, upon receiving said access method file, said at least one computer further includes:

facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;

and wherein said at least one computer peripheral further includes:
a facsimile modem;
maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

55. The remote maintenance system for computer peripherals according to claim 44, wherein said at least one computer is a standard personal computer including a standard operating system therein and said at least one computer peripheral is a multi-function peripheral apparatus selectively including at least one of functions of scanning, printing, a facsimile, and copying.

56. The remote maintenance system for computer peripherals according to claim 53, wherein said at least one computer is a standard personal computer including a standard operating system therein and said at least one computer peripheral is a multi-function peripheral apparatus selectively including at least one of functions of scanning, printing, a facsimile, and copying.

57. The remote maintenance system for computer peripherals according to claim 52, wherein said at least one computer is a standard personal computer including a standard operating system therein and said at least one computer peripheral is a multi-function peripheral apparatus selectively including at least one of functions of scanning, printing, a facsimile, and copying.

58. The remote maintenance system for computer peripherals according to claim 51, wherein said at least one computer is a standard personal computer including a standard operating system therein and said at least one computer peripheral is a multi-function peripheral apparatus selectively including at least one of functions of scanning, printing, a facsimile, and copying.

59. The remote maintenance system for computer peripherals according to claim 50, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit data writing operations, and said at least one computer further includes:

a fifth memory; and first maintenance data request means for determining whether said selected instruction instructs an operation of writing said maintenance data using said replacement data, said memory addresses, and said target bit in said memory addresses, for requesting said at least one computer peripheral to transmit said maintenance data stored in said first memory of said at least one computer peripheral at said location specified by said memory addresses to said fifth memory of said at least one computer when said instruction is determined as to execute said operation of writing said maintenance data using said replacement data, said memory addresses, and said target bit in said memory addresses;

said at least one computer peripheral further includes:

first maintenance data transmitting means for transmitting said maintenance data stored in said first memory of said at least one computer peripheral at said location specified by said memory addresses to said fifth memory of said at least one computer;

said at least one computer further includes:

second bit-unit data writing means for examining data of said maintenance data stored in said fifth memory of said at least one computer at said location specified by said target bit and said memory addresses, for writing said data of said maintenance data at said target bit of said memory addresses using said replacement data according to said selected instruction only when data of said maintenance data at said target bit of said memory addresses in said fifth memory differs from said replacement data, and for transmitting said written maintenance data back to said at least one computer peripheral so that said maintenance execution means executes a writing operation of said written maintenance data.

60. The remote maintenance system for computer peripherals according to claim 59, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:

second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;

and wherein said at least one computer further includes:

a sixth memory for storing data in said predetermined file form;

second data reformatting means for receiving said maintenance data transmitted by said second maintenance data transmitting means, for reformatting said received maintenance data into said predetermined file form, and for transmitting said reformatted maintenance data into said sixth memory.

61. The remote maintenance system for computer peripherals according to claim 60, further comprising:

access method file generating means provided at said remote maintenance provider's site for generating an access method file including a plurality of access methods, to be used selectively, and for transmitting said access method file to said link method using said first receiving and transmitting means;

and wherein said at least one computer further includes:

access method selecting means for selecting an access method among from said plurality of said access methods included in said access method file list received via said link method and for preparing a file transmitting condition in accordance with said selected access method; and maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

62. The remote maintenance system for computer peripherals according to claim 61, wherein said access method selecting means automatically search and store a facsimile number of a facsimile apparatus of said remote maintenance provider's site, included in said access method file, upon receiving said access method file, said at least one computer further includes:

facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;

and wherein said at least one computer peripherals further includes:

a facsimile modem;

maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

63. The remote maintenance system for computer peripherals according to claim 62, wherein said at least one computer is a standard personal computer including a standard operating system therein and said at least one computer peripheral is a multi-function peripheral apparatus selectively including at least one of functions of scanning, printing, a facsimile, and copying.

64. The remote maintenance system for computer peripherals according to claim 61, wherein said computer is a standard personal computer including a standard operating system therein and said at least one computer peripheral is a multi-function peripheral apparatus selectively including at least one of functions of scanning, printing, a facsimile, and copying.

65. The remote maintenance system for computer peripherals according to claim 60, wherein said computer is a standard personal computer including a standard operating system therein and said at least one computer peripheral is a multi-function peripheral apparatus selectively including at least one of functions of scanning, printing, a facsimile, and copying.

66. The remote maintenance system for computer peripherals according to claim 59, wherein said at least on computer is a standard personal computer including a standard operating system therein and said at least one computer peripheral is a multi-function peripheral apparatus selectively including at least one of functions of scanning, printing, a facsimile, and copying.

67. The remote maintenance system for computer peripherals according to claim 50, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:

second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least computer when said instruction instructs said reading operation;

and wherein said computer further includes:
a sixth memory for storing data in said predetermined file form;
second data reformatting means for receiving said maintenance data transmitted by said second maintenance data transmitting means, for reformatting said received maintenance data into said predetermined file form, and for transmitting said reformatted maintenance data into said sixth memory.

68. The remote maintenance system for computer peripherals according to claim 67, further comprising:

access method file generating means provided at said remote maintenance provider's site for generating an access method file including a plurality of access methods, to be used selectively, and for transmitting said access method file to said link method using said first receiving and transmitting means;

and wherein said at least one computer further includes:
access method selecting means for selecting an access method among from said plurality of said access methods included in said access method file list received via said link method and for preparing a file transmitting condition in accordance with said selected access method; and
maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

69. The remote maintenance system for computer peripherals according to claim 68, wherein said access method selecting means automatically search and store a facsimile number of a facsimile apparatus of said remote maintenance provider's site, included in said access method file, upon receiving said access method file, said at least one computer further includes:

facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;

and wherein said at least one computer peripheral further includes:
a facsimile modem;
maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

70. The remote maintenance system for computer peripherals according to claim 69, wherein said at least one computer is a standard personal computer including a standard operating system therein and said at least one computer peripheral is a multi-function peripheral apparatus selectively including at least one of functions of scanning, printing, a facsimile, and copying.

71. The remote maintenance system for said at least one computer peripherals according to claim 68, wherein said at least one computer is a standard personal computer including a standard operating system therein and said at least one computer peripheral is a multi-function peripheral apparatus selectively including at least one of functions of scanning, printing, a facsimile, and copying.

72. The remote maintenance system for computer peripheral according to claim 67, wherein computer is a standard personal computer including a standard operating system therein and said at least one computer peripheral is a multi-function peripheral apparatus selectively including at least one of functions of scanning, printing, a facsimile, and copying.

73. The remote maintenance system for computer peripherals according to claim 50, wherein said at least one computer is a standard personal computer including a standard operating system therein and said at least one computer peripheral is a multi-function peripheral apparatus selectively including at least one of functions of scanning, printing, a facsimile, and copying.

74. The remote maintenance system for computer peripherals according to claim 1, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit writing operations, and said at least one computer peripheral further comprising:

first bit-unit data writing means for examining data of said maintenance data at said target bit of said memory addresses in said first memory, and for writing said data of said maintenance data at said target bit of said memory addresses in said first memory using said replacement data only when data of said maintenance data at said target bit of said memory addresses in said first memory differs from said replacement data.

75. The remote maintenance system for computer peripherals according to claim 74, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:

second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;

and wherein said at least one computer further includes:
a sixth memory for storing data in said predetermined file form;
second data reformatting means for receiving said maintenance data transmitted by said second maintenance data transmitting means, for reformatting said received maintenance data into said predetermined file form, and for transmitting said reformatted maintenance data into said sixth memory.

76. The remote maintenance system for computer peripherals according to claim 75, further comprising:

access method file generating means provided at said remote maintenance provider's site for generating an access method file including a plurality of access methods, to be used selectively, and for transmitting said access method file to said link method using said first receiving and transmitting means;

and wherein said at least one computer further includes:
access method selecting means for selecting an access method among from said plurality of said access methods included in said access method file list received via said link method and for preparing a file transmitting condition in accordance with said selected access method; and
maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

77. The remote maintenance system for computer peripherals according to claim 76, wherein said access method selecting means automatically search and store a facsimile number of a facsimile apparatus of said remote maintenance provider's site, included in said access method file, upon receiving said access method file, said at least one computer further includes:

facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;

and wherein said at least one computer peripherals further includes:
a facsimile modem;
maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

78. The remote maintenance system for computer peripherals according to claim 77, wherein said at least one computer is a standard personal computer including a standard operating system therein and said at least one computer peripheral is a multi-function peripheral apparatus selectively including at least one of functions of scanning, printing, a facsimile, and copying.

79. The remote maintenance system for computer peripherals according to claim 76, wherein said at least one computer is a standard personal computer including a standard operating system therein and said at least one computer peripheral is a multi-function peripheral apparatus selectively including at least one of functions of scanning, printing, a facsimile, and copying.

80. The remote maintenance system for computer peripheral according to claim 75, wherein said at least one computer is a standard personal computer including a standard operating system therein and said at least one computer peripheral is a multi-function peripheral apparatus selectively including at least one of functions of scanning, printing, a facsimile, and copying.

81. The remote maintenance system for computer peripheral according to claim 74, wherein said at least one computer is a standard personal computer including a standard operating system therein and said at least one computer peripheral is a multi-function peripheral apparatus selectively including at least one of functions of scanning, printing, a facsimile, and copying.

82. The remote maintenance system for computer peripherals according to claim 1, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit data writing operations, and computer further includes:

a fifth memory; and first maintenance data request means for determining whether said selected instruction instructs an operation of writing said maintenance data using said replacement data, said memory addresses, and said target bit in said memory addresses, for requesting said at least one computer peripheral to transmit said maintenance data stored in said first memory of said at least one computer peripheral at said location specified by said memory addresses to said fifth memory of said at least one computer when said instruction is determined as to execute said operation of writing said maintenance data using said replacement data, said memory addresses, and said target bit in said memory addresses;

said at least one computer peripheral further includes:

first maintenance data transmitting means for transmitting said maintenance data stored in said first memory of said at least one computer peripheral at said location specified by said memory addresses to said fifth memory of said at least one computer;

said at least one computer further includes:

second bit-unit data writing means for examining data of said maintenance data stored in said fifth memory of said at least one computer at said location specified by said target bit and said memory addresses, for writing said data of said maintenance data at said target bit of said memory addresses using said replacement data according to said selected instruction only when data of said maintenance data at said target bit of said memory addresses in said fifth memory differs from said replacement data, and for transmitting said written maintenance data back to said at least one computer peripheral so that said maintenance execution means executes a writing operation of said written maintenance data.

83. The remote maintenance system for computer peripherals according to claim 82, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:

second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;

and wherein said at least one computer further includes:

a sixth memory for storing data in said predetermined file form;

second data reformatting means for receiving said maintenance data transmitted by said second maintenance data transmitting means, for reformatting said received maintenance data into said predetermined file form, and for transmitting said reformatted maintenance data into said sixth memory.

84. The remote maintenance system for computer peripherals according to claim 83, further comprising:

access method file generating means provided at said remote maintenance provider's site for generating an access method file including a plurality of access methods, to be used selectively, and for transmitting said access method file to said link method using said first receiving and transmitting means;

and wherein said at least one computer further includes:

access method selecting means for selecting an access method among from said plurality of said access methods included in said access method file list received via said link method and for preparing a file transmitting condition in accordance with said selected access method; and maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

85. The remote maintenance system for computer peripherals according to claim 84, wherein said access method selecting means automatically search and store a facsimile number of a facsimile apparatus of said remote maintenance provider's site, included in said access method file, upon receiving said access method file, said at least one computer further includes:

facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;

and wherein said at least one computer peripheral further includes:

a facsimile modem;

maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

86. The remote maintenance system for computer peripherals according to claim 85, wherein said at least one computer is a standard personal computer including a standard operating system therein and said at least one computer peripheral is a multi-function peripheral apparatus selectively including at least one of functions of scanning, printing, a facsimile, and copying.

87. The remote maintenance system for computer peripherals according to claim 84, wherein said at least one computer is a standard personal computer including a standard operating system therein and said at least one computer peripheral is a multi-function peripheral apparatus selectively including at least one of functions of scanning, printing, a facsimile, and copying.

88. The remote maintenance system for computer peripherals according to claim 83, wherein said at least one computer is a standard personal computer including a standard operating system therein and said at least one computer peripheral is a multi-function peripheral apparatus selectively including at least one of functions of scanning, printing, a facsimile, and copying.

89. The remote maintenance system for computer peripherals according to claim 82, wherein said at least one computer is a standard personal computer including a standard operating system therein and said at least one computer peripheral is a multi-function peripheral apparatus selectively including at least one of functions of scanning, printing, a facsimile, and copying.

90. The remote maintenance system for computer peripherals according to claim 1, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:
second maintenance data transmitting means for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;
and wherein said at least one computer further includes:
a sixth memory for storing data in said predetermined file form;
second data reformatting means for receiving said maintenance data transmitted by said second maintenance data transmitting means, for reformatting said received maintenance data into said predetermined file form, and for transmitting said reformatted maintenance data into said sixth memory.

91. The remote maintenance system for computer peripherals according to claim 90, further comprising:
access method file generating means provided at said remote maintenance provider's site for generating an access method file including a plurality of access methods, to be used selectively, and for transmitting said access method file to said link method using said first receiving and transmitting means;
and wherein said at least one computer further includes:
access method selecting means for selecting an access method among from said plurality of said access methods included in said access method file list received via said link method and for preparing a file transmitting condition in accordance with said selected access method; and
maintenance data file transmitting means for determining whether said file transmitting condition is prepared in accordance with said selected access method and for transmitting maintenance data file of said at least one computer peripheral to said remote maintenance provider's site using said prepared access method and said second receiving and transmitting means over said link method.

92. The remote maintenance system for computer peripherals according to claim 91, wherein said access method selecting means automatically search and store a facsimile number of a facsimile apparatus of said remote maintenance provider's site, included in said access method file, upon receiving said access method file, said at least one computer further includes:
facsimile number transmitting means for determining whether said access method is busy and whether said facsimile number is stored by said access method selecting means, when said maintenance data file is stored into said sixth memory, for transmitting said facsimile number and said maintenance data file to said at least one computer peripheral when said access method is busy and when said facsimile number is stored, and for activating said maintenance data file transmitting means to transmit said maintenance data file to said link method using said second receiving and transmitting means when said access method is not busy and when said facsimile number is not stored;
and wherein said at least one computer peripheral further includes:
a facsimile modem;
maintenance data file facsimile transmitting means for transmitting said maintenance data file of said at least one computer peripheral sent by said facsimile number transmitting means to said facsimile apparatus at said remote maintenance provider's site using said facsimile number transmitted by said facsimile number transmitting means through said facsimile modem, upon receiving said facsimile number and said maintenance data file sent by said facsimile number transmitting means.

93. The remote maintenance system for computer peripherals according to claim 92, wherein said at least one computer is a standard personal computer including a standard operating system therein and said at least one computer peripheral is a multi-function peripheral apparatus selectively including at least one of functions of scanning, printing, a facsimile, and copying.

94. The remote maintenance system for computer peripheral, according to claim 92, wherein said facsimile number transmitting means for transmitting said facsimile number and said maintenance data file to said at least one computer peripheral, regardless of conditions whether said access method is busy when said facsimile number is stored.

95. The remote maintenance system for computer peripherals according to claim 91, wherein said at least one computer is a standard personal computer including a standard operating system therein and said computer peripherals is a multi-function peripheral apparatus selectively including at least one of functions of scanning, printing, a facsimile, and copying.

96. The remote maintenance system for computer peripherals according to claim 90, wherein said at least one computer is a standard personal computer including a standard operating system therein and said computer peripherals is a multi-function peripheral apparatus selectively including at least one of functions of scanning, printing, a facsimile, and copying.

97. The remote maintenance system for computer peripherals, according to claim 90, wherein said link method is Internet.

98. The remote maintenance system for computer peripherals according to claim 1, wherein said computer is a standard personal computer including a standard operating system therein and said at least one computer peripheral is a multi-function peripheral apparatus selectively including at least one of functions of scanning, printing, a facsimile, and copying.

99. The remote maintenance system for computer peripherals, according to claim 1, wherein said link method is Internet.

100. The remote maintenance system for computer peripheral, according to claim 1, wherein said first memory is an erasable programmable memory.

101. The remote maintenance system for computer peripheral, according to claim 1, wherein said first memory is a flash memory.

102. The remote maintenance system for computer peripheral, according to claim 1, wherein said first memory is a nonvolatile memory.

103. A remote maintenance system for computer peripherals, comprising:

at least one computer;

at least one computer peripheral coupled to said at least one computer and including a first memory for storing maintenance data including identification information for identifying said at least one computer peripheral and programmed parameters for adjusting an operating condition of said at least one computer peripheral, the at least one computer communicating information from a remote maintenance provider's site to the at least one peripheral;

source script file generator provided at the remote maintenance provider's site for generating a source script file including instructions for instructing at least one of operations of reading and writing said maintenance data stored in said first memory of said at least one computer peripheral and for providing the source script file to the at least one computer; and first data receiver and transmitter provided at the remote maintenance provider's site for receiving information via a link method connecting said first data receiver and transmitter and said at least one computer and for transmitting said source script file created by said source script file generator via said link method;

wherein said at least one computer comprises:

second data receiver and transmitter for receiving said source script file sent from said first data receiver and transmitter via said link method and for transmitting data via said link method and to said at least one computer peripheral;

selector for selecting an instruction for a model of said at least one computer peripheral connected to said at least one computer from among said instructions included in said source script file and for generating a model-specific script file including said selected instruction;

a second memory for storing said model-specific script file;

download manager for downloading said model-specific script file including said selected instruction into said second memory; and maintenance application executor for executing at an arbitrary time a maintenance application for transmitting said downloaded model-specific script file to said at least one computer peripheral after said model-specific script file is downloaded into said second memory;

and wherein said at least one computer peripheral further comprises:

maintenance executor for executing at least one of reading and writing said maintenance data stored in said first memory of said at least one computer peripheral in accordance with said selected instruction included in said model-specific script file; and result return manager for determining whether said maintenance executor has properly executed said operations of reading and writing said maintenance data in accordance with said selected instruction and for transmitting a result of said determination to said at least one computer.

104. The remote maintenance system for computer peripherals according to claim 103, wherein each one of said instructions included in said source and model-specific script files includes model specification information for specifying a model of said at least one computer peripheral to which said instructions are applicable, said identification information stored in said first memory includes model identification information, and said at least one computer peripheral further includes:

verifying manager for verifying said model specification information against said model identification information included in said identification information stored in said first memory of said at least one computer peripheral before said maintenance executor starts said execution of at least one of said operations of reading and writing said maintenance data;

first maintenance execution controller for controlling said maintenance executor to continue said execution of at least one of said operations of reading and writing said maintenance data when said model specification information included in said instruction of said model-specific script file is verified against said model identification information included in said identification information stored in said first memory of said at least one computer peripheral by said verifying manager and to stop said execution of at least one of said operations of reading and writing said maintenance data when said model specification information included in said instruction of said model-specific script file is failed to be verified against said model identification information included in said identification information stored in said first memory of said at least one computer peripheral by said verifying manager.

105. The remote maintenance system for computer peripherals according to claim 103, wherein, when said selected instruction included in said model-specific script file instructs an operation of writing said maintenance data stored in said first memory of said computer peripheral, said selected instruction includes replacement data for changing a portion of said maintenance and memory addresses for specifying a location of said maintenance data to be changed in said first memory, and said computer further includes:

first state restoring instruction generator for sending at arbitrary time a state restoring command to said at least one computer peripheral after maintenance executor executes at least one of said operations of reading and writing said maintenance data, said state restoring command restoring a state of said at least one computer peripheral to a previous state of said same;

and wherein said at least one computer peripheral further includes:

a third memory for storing information including said memory addresses, included in said instruction of said model-specific script file, and associated data;

second maintenance execution controller for determining whether said selected instruction instructs an operation of writing said maintenance data using said replacement data and said memory addresses, for storing said memory addresses and data representing a present state of said maintenance data, stored in said first memory at said location specified by said memory addresses, into said third memory when said selected instruction is determined as to execute a writing operation, said present state being regarded as a previous state after being stored into said third memory, and, then, for enabling said maintenance executor to execute said operation of writing said maintenance data using said replacement data and said memory address;

first state restoring executor for restoring a state of said maintenance data stored in said first memory to a previous state using said memory addresses and said previous state stored in said third memory when said at least one computer peripheral receives a state storing command sent from said first state storing instruction generator of said at least one computer.

106. The remote maintenance system for computer peripherals according to claim 103, wherein, when said selected instruction included in said model-specific script file instructs an operation of writing said maintenance data stored in said first memory of said at least one computer peripheral, said selected instruction includes replacement data for changing a portion of said maintenance data and memory addresses for specifying a location of said maintenance data to be changed in said first memory, said at least one computer peripheral further includes:

third maintenance execution controller for determining whether said selected instruction instructs an operation of writing said maintenance data using said replacement data and said memory addresses, and for transmitting said memory addresses and a present state of said maintenance data, stored in said first memory at a location specified by said memory addresses, to said at least one computer when said instruction is determined as to execute said operation of writing said maintenance data, said present state being regarded as a previous state when being transmitted to said at least one computer, and, then, for enabling said maintenance executor to execute said operation of writing said maintenance data using said replacement data and said memory addresses;

wherein said at least one computer further includes:

a fourth memory for storing data in a predetermined file form;

first data reformatting manager for reformatting data representing said memory addresses and previous state, sent by said third maintenance execution controller, into said predetermined file form and for storing said reformatted data representing said memory addresses and present state into said fourth memory with making a linkage with said selected instruction included in said model-specific script file;

second state restoring instruction generator for sending at arbitrary time a state restoring command to return to said previous state of said maintenance data at said memory addresses to said at least one computer peripheral after maintenance executor executes at least one of said operations of reading and writing said maintenance data, said state restoring command restoring a state of said at least one computer peripheral to a previous state of said same stored in said fourth memory of said at least one computer;

and wherein said at least one computer peripheral further includes;

second state restoring executor for restoring a state of said maintenance data stored in said first memory to a previous state using said memory addresses and said previous state stored in said predetermined file form in said fourth memory of said computer when said at least one computer peripheral receives a state storing command sent from said first state storing instruction generator of said at least one computer.

107. The remote maintenance system for computer peripherals according to claim 103, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit writing operations, and said at least one computer peripheral further includes:

first bit-unit data writing executor for examining data of said maintenance data at said target bit of said memory addresses in said first memory, and for writing said data of said maintenance data at said target bit of said memory addresses in said first memory using said replacement data only when data of said maintenance data at said target bit of said memory addresses in said first memory differs from said replacement data.

108. The remote maintenance system for computer peripherals according to claim 103, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit data writing operations, and said computer further includes:

a fifth memory; and first maintenance data request manager for determining whether said selected instruction instructs an operation of writing said maintenance data using said replacement data, said memory addresses, and said target bit in said memory addresses, for requesting said at least one computer peripheral to transmit said maintenance data stored in said first memory of said at least one computer peripheral at said location specified by said memory addresses to said fifth memory of said at least one computer when said instruction is determined as to execute said operation of writing said maintenance data using said replacement data, said memory addresses, and said target bit in said memory addresses;

said at least one computer peripheral further includes:
first maintenance data transmitter for transmitting said maintenance data stored in said first memory of said at least one computer peripheral at said location specified by said memory addresses to said fifth memory of said at least one computer;

said at least one computer further includes:
second bit-unit data writing executor for examining data of said maintenance data stored in said fifth memory of said at least one computer at said location specified by said target bit and said memory addresses, for writing said data of said maintenance data at said target bit of said memory addresses using said replacement data according to said selected instruction only when data of said maintenance data at said target bit of said memory addresses in said fifth memory differs from said replacement data, and for transmitting said written maintenance data back to said at least one computer peripheral so that said maintenance executor executes a writing operation of said written maintenance data.

109. The remote maintenance system for computer peripherals according to claim 103, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes:

second maintenance data transmitter for determining whether said selected instruction instructs an operation of reading said maintenance data stored in said first memory of said at least one computer peripheral, for reading said maintenance data stored in said first memory at said location specified by said address information included in said selected instruction, and for transmitting said read maintenance data to said at least one computer when said instruction instructs said reading operation;

and wherein said at least one computer further includes:
a sixth memory for storing data in said predetermined file form;
second data reformatting manager for receiving said maintenance data transmitted by said second maintenance data transmitter, for reformatting said received maintenance data into said predetermined file form, and for transmitting said reformatted maintenance data into said sixth memory.

110. The remote maintenance system for computer peripherals according to claim 109, further comprising:
access method file generator provided at said remote maintenance provider's site for generating an access method file including a plurality of access methods, to be used selectively, and for transmitting said access method file to said link method using said first data receiver and transmitter;
and wherein said at least one computer further includes:
access method selector for selecting an access method among from said plurality of said access methods included in said access method file list received via said link method and for preparing a file transmitting condition in accordance with said selected access method; and
maintenance data file transmitter for determining whether said file transmitting condition is prepared in accordance with said selected access method, and for transmitting maintenance data file of said at least one computer peripheral to said remote maintenance provider's site using said prepared access method and said second receiver and transmitter over said link method when said file transmitting condition is prepared.

111. The remote maintenance system for computer peripherals according to claim 110, wherein said access method selector automatically search and store a facsimile number of a facsimile apparatus of said remote maintenance provider's site, included in said access method file, upon receiving said access method file, said at least one computer further includes:

facsimile number transmitter for determining whether said access method is busy and whether said facsimile number is stored by said access method selector, when said maintenance data file is stored into said sixth memory, for transmitting said facsimile number and said maintenance data file to said at least one computer peripheral when said access method is busy and when said facsimile number is stored, and for activating said maintenance data file transmitter to transmit said maintenance data file to said link method using said second receiver and transmitter when said access method is not busy and when said facsimile number is not stored;

and wherein said at least one computer peripheral further includes:
a facsimile modem;
maintenance data file facsimile transmitter for transmitting said maintenance data file of said at least one computer peripheral sent by said facsimile number transmitter to said facsimile apparatus at said remote maintenance provider's site using said facsimile number transmitted by said facsimile number transmitter through said facsimile modem, upon receiving said facsimile number and said maintenance data file sent by said facsimile number transmitter.

112. The remote maintenance system for computer peripherals according to claim 103, wherein said at least one computer is a standard personal computer including a standard operating system therein and said at least one computer peripheral is a multi-function peripheral apparatus selectively including at least one of functions of scanning, printing, a facsimile, and copying.

113. The remote maintenance system for computer peripherals, according to claim 103, wherein said link method is Internet.

114. A remote maintenance method for remotely maintaining computer peripherals including
at least one computer;
at least one computer peripheral coupled to said computer and including a first memory for storing maintenance data including identification information for identifying said at least one computer peripheral and programmed parameters for adjusting an operating condition of said at least one computer peripheral, the at least one computer communicating information between a remote maintenance provider's site to the at least one computer peripheral;
said remote maintenance method comprising the steps of:

generating a source script file at said remote maintenance provider's site, including instructions of an execution of at least one of operations of reading and writing said maintenance data stored in said first memory of said at least one computer peripheral;

transmitting said source script file generated by said source script file generating step to a link method for transmitting data to said at least one computer;

receiving at said at least computer, said source script file transmitted by said step of transmitting over said link method;

selecting at said at least one computer an instruction for a model of said at least one computer peripheral connected to said at least one computer from among said instructions included in said source script file and generating a model-specific script file including said selected instruction;

storing said model-specific script file into a second memory;

downloading said model-specific script file including said selected instruction into said second memory;

executing at an arbitrary time a maintenance application and transmitting said downloaded model-specific script file to said at least one computer peripheral after said step of downloading said model-specific script file into said second memory;

executing at least one of reading and writing said maintenance data stored in said first memory of said at least one computer peripheral in accordance with said selected instruction included in said model-specific script file; and determining whether said step of executing said operations of reading and writing said maintenance data in accordance with said selected instruction have been properly executed and transmitting a result of said determination to said at least one computer.

115. The remote maintenance system for computer peripherals according to claim 114, wherein each one of said instructions included in said source and model-specific script files includes model specification information for specifying a model of said at least one computer peripheral to which said instructions are applicable, said identification information stored in said first memory includes model identification information, and said at least one computer peripheral further includes the steps of:

verifying said model specification information against said model identification information included in said identification information stored in said first memory of said at least one computer peripheral before starting said step of executing at least one of said operations of reading and writing said maintenance data;

controlling said step of executing at least one of said operations of reading and writing said maintenance data to continue when said model specification information included in said instruction of said model-specific script file is verified against said model identification information included in said identification information stored in said first memory of said at least one computer peripheral by said step of verifying and to stop when said model specification information included in said instruction of said model-specific script file is failed to be verified against said model identification information included in said identification information stored in said first memory of said at least one computer peripheral by said step of verifying.

116. The remote maintenance system for computer peripherals according to claim 114, wherein, when said selected instruction included in said model-specific script file instructs an operation of writing said maintenance data stored in said first memory of said at least one computer peripheral, said selected instruction includes replacement data for changing a portion of said maintenance and memory addresses for specifying a location of said maintenance data to be changed in said first memory, and said at least one computer further includes the steps of:

sending at arbitrary time a state restoring command to said at least one computer peripheral after said step of executing at least one of said operations of reading and writing said maintenance data, said state restoring command restoring a state of said at least one computer peripheral to a previous state of said same;

and wherein said at least one computer peripheral further includes the steps of:

storing information including said memory addresses, included in said instruction of said model-specific script file, and associated data into a third memory;

first determining whether said selected instruction instructs an operation of writing said maintenance data using said replacement data and said memory addresses, storing said memory addresses and data representing a present state of said maintenance data, stored in said first memory at said location specified by said memory addresses, into said third memory when said selected instruction is determined as to execute a writing operation by said step of first determining, said present state being regarded as a previous state after being stored into said third memory by the step of storing, and, then, for enabling said step of executing said operation of writing said maintenance data using said replacement data and said memory addresses;

restoring a state of said maintenance data stored in said first memory to a previous state using said memory addresses and said previous state stored in said third memory when said at least one computer peripheral receives a state storing command sent by the step of sending from said at least one computer.

117. The remote maintenance system for computer peripherals according to claim 114, wherein, when said selected instruction included in said model-specific script file instructs an operation of writing said maintenance data stored in said first memory of said at least one computer peripheral, said selected instruction includes replacement data for changing a portion of said maintenance data and memory addresses for specifying a location of said maintenance data to be changed in said first memory, said at least one computer peripheral further includes the steps of:

second determining whether said selected instruction instructs an operation of writing said maintenance data using said replacement data and said memory addresses, and transmitting said memory addresses and a present state of said maintenance data, stored in said first memory at a location specified by said memory addresses, to said computer when said instruction is determined as to execute said operation of writing said maintenance data by said step of second determining, said present state being regarded as a previous state when being transmitted to said at least one computer by the step of transmitting, and, then, for enabling said step of executing said operation of writing said maintenance data using said replacement data and said memory addresses;

wherein said at least one computer further includes the steps of:

storing data in a predetermined file form into a fourth memory;

reformatting data representing said memory addresses and previous state, sent by said step of transmitting, into said predetermined file form and storing said reformatted data representing said memory addresses and present state into said fourth memory with making a linkage with said selected instruction included in said model-specific script file;

sending at arbitrary time a state restoring command to return to said previous state of said maintenance data at said memory addresses to said at least one computer peripheral after said step of executing at least one of said operations of reading and writing said maintenance data, said state restoring command restoring a state of said at least one computer peripheral to a previous state of said same stored in said fourth memory of said at least one computer;

and wherein said at least one computer peripheral further includes the steps of;

restoring a state of said maintenance data stored in said first memory to a previous state using said memory addresses and said previous state stored in said predetermined file form in said fourth memory of said at least one computer when said at least one computer peripheral receives a state storing command sent by said step of sending from said at least one computer.

118. The remote maintenance system for computer peripherals according to claim 114, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit data writing operations, and said at least one computer peripheral further includes the steps of:

first examining data of said maintenance data at said target bit of said memory addresses in said first memory, and writing said data of said maintenance data at said target bit of said memory addresses in said first memory using said replacement data only when said step of first examining clarifies that data of said maintenance data at said target bit of said memory addresses in said first memory differs from said replacement data.

119. The remote maintenance system for computer peripherals according to claim 114, wherein, when said selected instruction included in said model-specific script file instructs an operation of writing said maintenance data stored in said first memory of said at least one computer peripheral, said selected instruction includes replacement data for changing a portion of said maintenance data, memory addresses for specifying a location of said maintenance data to be changed in said first memory, a target bit in said memory addresses, and either one of a byte-unit and bit-unit data writing operations, and said at least one computer further includes:

a fifth memory;

said at least one computer further includes the steps of:

third determining whether said selected instruction instructs an operation of writing said maintenance data using said replacement data, said memory addresses, and said target bit in said memory addresses;

requesting said at least one computer peripheral to transmit said maintenance data stored in said first memory of said at least one computer peripheral at said location specified by said memory addresses to said fifth memory of said at least one computer when said instruction is determined as to execute said operation of writing said maintenance data using said replacement data, said memory addresses, and said target bit in said memory addresses by said step of determining;

said at least one computer peripheral further includes the step of:

transmitting said maintenance data, stored in said first memory of said at least one computer peripheral at said location specified by said memory addresses, to said fifth memory of said at least one computer;

said at least one computer peripheral further includes the steps of:

second examining data of said maintenance data stored in said fifth memory of said at least one computer at said location specified by said target bit and said memory addresses, for writing said data of said maintenance data at said target bit of said memory addresses using said replacement data according to said selected instruction only when said step of second examining clarifies that said maintenance data at said target bit of said memory addresses in said fifth memory differs from said replacement data;

transmitting said written maintenance data back to said at least one computer peripheral so that said step of executing executes a writing operation of said written maintenance data.

120. The remote maintenance system for computer peripherals according to claim 114, wherein said maintenance data stored in said first memory of said at least one computer peripheral represents operating condition statuses, error statuses, a history of engineering changes, and technical data, and said selected instruction included in said model-specific script file includes address information for specifying a location of said maintenance data in said first memory of said at least one computer peripheral at which desired information of said maintenance data is stored, wherein said at least one computer peripheral further includes the steps of:

fourth determining whether said selected instruction includes said address information for specifying said location of said maintenance data stored in said first memory of said at least one computer peripheral;

reading said maintenance data stored in said first memory at said location specified by said address information included in said selected instruction; and transmitting said read maintenance data to said at least one computer;

and said at least one computer further includes the steps of:

receiving said maintenance data transmitted by said step of reading;

reformatting said received maintenance data into a predetermined file form; and transmitting said reformatted maintenance data to a sixth memory, said reformatted maintenance data stored in said sixth memory being referred to as a maintenance data file.

121. The remote maintenance system for said at least one computer peripheral according to claim 120, further comprising the steps of:

generating at said remote maintenance provider's site an access method file including a plurality of access methods, to be used selectively; and transmitting said access method file, created by said step of generating, to said link method using said first data receiver and transmitter;

and wherein said at least one computer further includes the steps of:

selecting an access method among from said plurality of said access methods included in said access method file list received via said link method;

preparing a file transmitting condition in accordance with said selected access method;

fifth determining whether said file transmitting condition is prepared in accordance with said selected access method; and transmitting said maintenance data file of said at least one computer peripheral to said remote maintenance provider's site using said prepared access method and said link method.

122. The remote maintenance system for computer peripherals according to claim 121, wherein said at least one computer further includes steps of:

searching and storing a facsimile number of a facsimile apparatus of said remote maintenance provider's site, included in said access method file, upon receiving said access method file;

sixth determining whether said access method is busy and whether said facsimile number is stored upon an event that said maintenance data file is stored into said sixth memory;

transmitting said facsimile number and said maintenance data file to said at least one computer peripheral when said access method is busy and when said facsimile number is stored;

and said at least one computer peripheral further includes the steps of:

transmitting said maintenance data file of said at least one computer peripheral stored in said first memory of said at least one computer peripheral to said facsimile machine at said remote maintenance provider's site using said facsimile number transmitted by said step of transmitting, through said facsimile modem, upon receiving said facsimile number and said maintenance data file.

123. The remote maintenance system for computer peripherals according to claim 114, wherein said at least one computer is a standard personal computer including a standard operating system therein and said at least one computer peripheral is a multi-function peripheral apparatus selectively including at least one of functions of scanning, printing, a facsimile, and copying.

124. The remote maintenance system for computer peripherals, according to claim 114, wherein said link method is Internet.

125. A computer for performing remote maintenance on a computer peripheral, the computer peripheral coupled to the computer and including a first memory for storing maintenance data including identification information for identifying the computer peripheral and programmed parameters for adjusting an operating condition of the computer peripheral, the computer communicating information from a remote maintenance provider's site to the computer peripheral, said computer comprising:

a data receiver and transmitter for receiving a source script file sent from the remote maintenance provider's site and for transmitting data to said at least one computer peripheral;

a selector for selecting an instruction for a model of said computer peripheral connected to said computer from among instructions included in said source script file and for generating a model-specific script file including said selected instruction;

a second memory for storing said model-specific script file;

a download manager for downloading said model-specific script file including said selected instruction into said second memory; and maintenance application executor for executing at an arbitrary time a maintenance application for transmitting said downloaded model-specific script file to said computer peripheral after said model-specific script file is downloaded into said second memory.

126. A computer as recited in claim 125, wherein the source script file is sent from the remote maintenance provider's site via E-mail.

127. A computer as recited in claim 125, wherein the source script file is sent from the remote maintenance provider's site via a computer readable recording medium.

128. A computer as recited in claim 127, wherein the computer readable recording medium comprises a floppy disk.

129. A computer as recited in claim 125, wherein the source script file is sent from the remote maintenance provider's site via a telephone network.

130. A computer as recited in claim 125, wherein the source script file is sent from the remote maintenance provider's site via an Internet.

* * * * *